INVENTOR.
RAYMOND H. LAZINSKI

Aug. 14, 1956    R. H. LAZINSKI    2,758,786
DEPARTMENTAL PROGRAM ANALYZER MACHINE
Filed Jan. 3, 1951    15 Sheets-Sheet 2
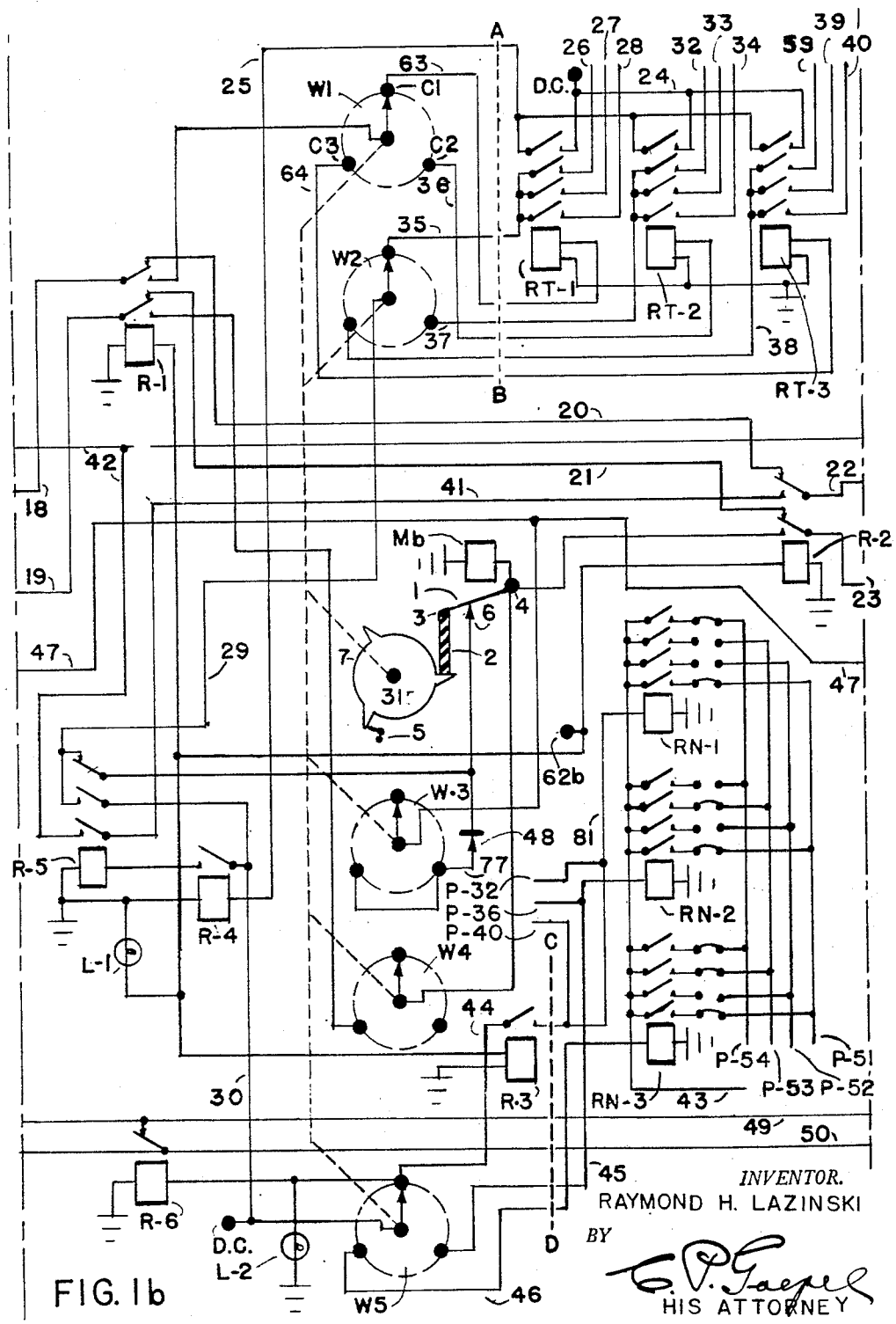
FIG. 1b
INVENTOR.
RAYMOND H. LAZINSKI
BY 
HIS ATTORNEY Aug. 14, 1956         R. H. LAZINSKI         2,758,786

DEPARTMENTAL PROGRAM ANALYZER MACHINE

Filed Jan. 3, 1951                           15 Sheets-Sheet 6

| TIME | MON | TUE | WED | THU | FRI | | SUBJECT | | | | | | | |
|---|---|---|---|---|---|---|---|---|---|---|---|---|---|---|
| | | | | | | | 1 | 2 | 3 | 4 | | | | |
| 9-9:30 | · | · | · | · | · | A | · | · | · | · | · | · | · | · |
| 9:30-10 | · | · | · | · | · | B | · | · | · | · | · | · | · | · |
| 10-11 | · | · | · | · | · | C | · | · | · | · | · | · | · | · |
| 11-12 | · | · | · | · | · | D | · | · | · | · | · | · | · | · |
| 12-1 | · | · | · | · | · | | | | | | | | | |
| 1-2 | · | · | · | · | · | | | | | | | | | |

*INVENTOR.*
RAYMOND H. LAZINSKI
BY

HIS ATTORNEY

INVENTOR.
RAYMOND H. LAZINSKI
BY
HIS ATTORNEY

Aug. 14, 1956 R. H. LAZINSKI 2,758,786
DEPARTMENTAL PROGRAM ANALYZER MACHINE
Filed Jan. 3, 1951 15 Sheets-Sheet 9

INVENTOR
RAYMOND H. LAZINSKI
BY
HIS ATTORNEY

Aug. 14, 1956  R. H. LAZINSKI  2,758,786
DEPARTMENTAL PROGRAM ANALYZER MACHINE
Filed Jan. 3, 1951  15 Sheets-Sheet 15

SEQUENCE DIAGRAM
OF CARD READER (FIG.12)
DURING 2ND READING
OF 1ST EXAMPLE PROGRAM

RSW-X-2 IS
MANUALLY SET
TO 0 AT INTERVAL
37

INVENTOR.
RAYMOND H. LAZINSKI
BY
HIS ATTORNEY

United States Patent Office 2,758,786
Patented Aug. 14, 1956

2,758,786

DEPARTMENTAL PROGRAM ANALYZER MACHINE

Raymond H. Lazinski, New York, N. Y.

Application January 3, 1951, Serial No. 204,201

3 Claims. (Cl. 235—61)

This invention relates, in general, to calculating machines. The object of this invention is to provide a programming machine which will produce consistent programs indicating to a registrant the time he will spend in class, the section designation and code number of the sections which in combination formulate each individual program, taking into account as criteria for consistency that no two sections meeting at the same time are included in one program, that no closed section is included in any program, that no section that meets at a time designated by the registrant as free time is included in any program, and that one section from each subject (designated as necessary for the production of a program) is included in each program.

The invention contemplates a free time input circuit, a subject assignment circuit, a punch circuit, a plurality of card punches, a plurality of selector banks, a card reader, a card printer, a card ejection mechanism, and a control circuit.

The invention will be further described, embodiments shown in the drawings, and the invention will be finally brought out in the claims.

In many large concerns it is necessary to program different operations on one object with no two operations being performed at the same time. In large institutions it is necessary to make departmental appointments making sure that the individual is routed to the proper departments, he has not two appointments to be at two different places at the same time and that too many people are not assigned to one department at one time. In institutions of higher learning it is necessary that a program of classes be worked out prior to the start of the semester.

A few definitions would be apropos. A course is the name of a general area of learning; such areas are History, Philosophy, Physics, etc. A subdivision of a course would be a subject. Examples are Early European History, Modern European History, American History, etc. A subdivision of a subject is a section. A section is a class, a group of individuals that meet at certain times and places during the week to study the subject. All sections of a subject cover the same material but they meet at different times and places during the week. Free time is the time during which the student has no classes programmed. A filled section or closed section is a section that has its maximum number of students enrolled for it. In the programming of a student for classes four conditions must be met for the formulation of a consistent program.

1. No two classes meeting at the same time during any part of the week are selected for one program. If this precaution were not taken the student would be required to be in two different places at the same time during part of the week.

2. No classes are assigned that meet when the student wishes to be free.

3. No classes are assigned to the student that have been previously filled or closed.

4. A subject selected is represented in each program.

It is required of the student to handle the following information in the formulation of a program.

a. The subjects needed and/or desired for the formulation of the program.
   b. The times of meeting of all the sections of the above mentioned subjects.
   c. The times the student wishes to be free and
   d. The sections which are available. The latter keeps changing with time as the sections are filled while registration proceeds.

The departmental program analyzer herein described will perform the programming procedure heretofore required in the above example. The description of this machine, the departmental program analyzer, in this case will illustrate its use in the latter example, that of programming students for classes in institutions of learning. The machine will receive information in the form of cards with coded holes punched in them and in the form of the machines buttons being pressed. By pressing the appropriate buttons the student can indicate what periods during the week he wishes to be free and what subjects he needs and/or wants. The machine, once started, will produce all possible or a preset number of program cards indicating:

1. What time of the week he will spend in class.
2. What sections to register for and
3. The code numbers of the sections of that program.

The student will then choose the most desirable of these program cards and insert it into a receiving slot. Upon the pressing of a record button the student is tallied, that is, counters indicate that one more student has been added to each of the sections entered on the card. The counters are preset before registration or set during registration by the registrar thus limiting the number of students assigned to one section. Upon that number of students being assigned to one section the machine will automatically take that information into account and will produce no more programs containing that section. A lamp will light indicating that the section is closed. If a program that contains in its program a section that is already closed is inserted into the card reading slot an alarm will ring, the card reading process will stop and lamps will light indicating which section is at fault. All programs produced will meet the four heretofore mentioned prerequisites for a consistent program. Upon selecting the most desirable program card of the number produced for that student the rest are discarded. Upon the machines reading of the program the section designations of that program will be printed on a master form. Other objects of the invention will be pointed out in the following description and claims and illustrated in the accompanying drawings, which disclose by way of example, the best mode, which has been contemplated in applying that principle.

In the drawings:

Figures 1a and 1b together constitute the circuit diagram of the selector banks and control circuits.

Figures 13a to 13h placed in the order named from left to right constitute a sequence diagram showing the order in which the more important relays and other current responsive devices are energized and the periods which they are maintained in energized condition.

Similar characters of reference indicate corresponding parts throughout the various views.

CIRCUIT DIAGRAM

In the circuit, the relays are shown adjacent to their related contacts; but in numerous instances, to avoid confusing extension of wires, the release magnets for locking relays (RL) are not usually shown adjacent to the relays they release. In many cases, where there are many locking relays to be released simultaneously, their release magnets wired in parallel, only one release magnet is shown and the description of operation indicates which relay the said release magnet will unlock. In the case of the punch armature magnets only the physical position of the punch rods are shown (see Fig. 7). Each punch denotation begins with a P and is followed by the number of the punch. The wires to the punch armature magnet are denoted by the letter A or B, following the number of the punch. This can be seen in Figure 8.

It will be assumed that all relays, release coils, stepping switch magnets, counter magnets, punch magnets, bulbs and alarms have the same working voltage. The symbol D. C. will indicate a connection to the common positive terminal of a direct current voltage source, producing the aforesaid working potential. All ground symbols will indicate a connection to the common negative terminal of this voltage source. All potentials hereafter mentioned will be with reference to the common negative terminal of the voltage source. In all cases the relay, stepping switch and punch armatures are shown in the position they retain when their respective magnets are not energized. In the case of locking relays, they are shown in their unlocked position; buttons are shown in their normal, undepressed position.

In this machine, there are many circuit units which have identical wiring diagrams; in all such cases only one of each such circuit unit is shown, the description indicating their means of interconnection.

Figure 1A:
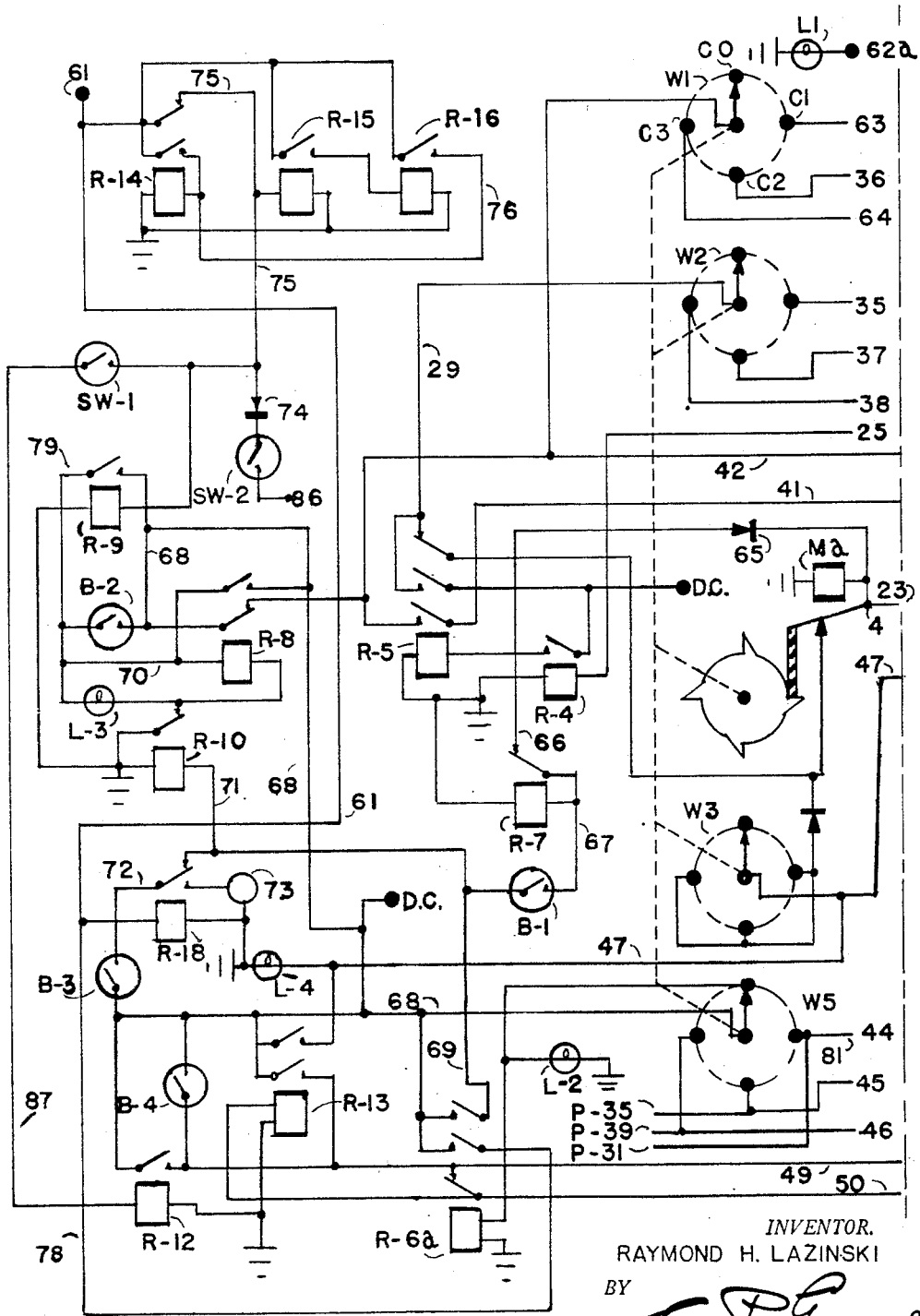
Figure 11:
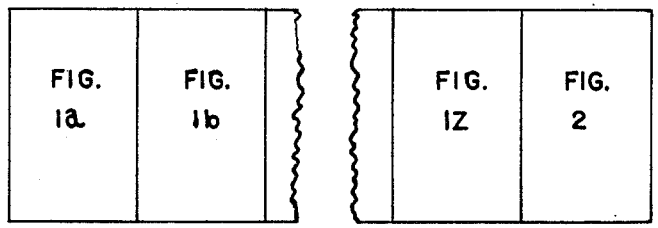
Figure 11 is a chart showing the manner in which the figures of the circuit diagram of the selector banks are arranged.

The circuit diagram of the selector banks extends through a number of figures which, when arranged in the order shown in Figure 11, constitute the complete wiring arrangement of the selector bank portion of the circuit. As the number of selector banks used depends on the problem to be solved, Figure 11 denotes an undetermined number of banks between Figure 1a and Figure 2. It will be noted that the circuit diagrams for all the selector banks are denoted by the number 1, followed by the letter of the bank. All the selector banks but a have the same circuit diagram as shown in Figure 1b. The circuit diagram for bank a is shown in Figure 1a. As all the selector banks have identical parts, the denotation for a part or wire in any bank will be the number of the part shown in Figure 1b, followed by the letter designation of the bank in which the part or wire referred to is contained.

The following notations will be used in the description and diagrams of this machine:

R—relay
RL—locking relay
TUL—Time unit line
CL—closed section line
RC—release coil of locking relay
P—punch armature magnet
SW—Switch (toggle)
B—push button
L—lamp bulb
W—wafer of rotary switch
C—contact, of rotary switch or relay
M—magnet operating stepping switch
RSW—rotary switch
RT—time memory relay
RN—number memory relay

ROTARY SWITCHES AND COUNTERS

In this machine there are two types of automatic stepping switches used. The type hereafter referred to as type a is a spring driven, telephone type automatic stepping switch with interrupter contacts attached. Such a switch is shown in Fig. 1b. It is composed of parts W1, W2, W3, W4, W5, Mb, 4, 6, 1, 3, 2, 7, 31 and 5. When the stepping switch magnet Mb is energized, the armature 1, which is pivoted at 4, is attracted to Mb, causing pawl 2, which is pivoted at 3, to engage the next tooth of the ratchet wheel 7. The accompanying diagrams are simplified for ease of comprehension; only three contacts per wafer are shown in Fig. 1b and, therefore, only 3 ratchet wheel teeth are shown. In an actual switch, there would be many more teeth, allowing a small movement of the pawl to engage the next tooth. Upon the de-energization of Mb, armature 1 and pawl 2 are returned to their normal positions by means of a spring (not shown) connected to the armature; thus causing the ratchet wheel 7 to move the common shaft 31 a portion of a clockwise revolution, one step. As the contact arms of wafers W1—W5 are attached to the shaft 31, without allowing an electrical path through the shaft between any of the contact arms or ratchet wheel 7, all the contact arms of their respective wafers will also rotate a portion of a revolution to the next contact on their respective wafers. Each time Mb is energized and then de-energized, the contact arms will move to the next contact on their respective wafers.

Retrograde rotation of the ratchet wheel is prevented by the check pawl 5. Contact 6, in conjunction with armature 1, acts as an interrupter. When a potential is applied to 6, current flows through Mb, attracting armature 1, the movement of which breaks the contact 1, 6. The magnet is de-energized, causing 1 to return to 6. This causes a reciprocatory motion to be imparted to pawl 2. The action of the armature 1, in this case, is very similar to the action of the armature of a household buzzer. The inertia of the armature 1 and pawl 2, and the adjustment of the contact 6 and 1 are such that every time 1 is attracted to Mb, pawl 2 engages the next tooth of the ratchet wheel 7. Upon the return of 1 to its normal position, it carries the shaft 31 and ratchet wheel 7 another portion of a revolution clockwise. When armature 1 returns to its normal position, the contact 6, 1 is made, causing the magnet Mb to be energized. This causes the switch to step to the next position. Thus, by applying a potential to 6, the pawl 2 will be caused to reciprocate, causing the rotary switch to continue to step until this potential is removed from contact 6.

The other type of stepping switch used in this machine will be denoted type b. One of those switches is shown on the right side of Fig. 2. The stepping action of this type of switch is very similar to that of type a, but in this case, the ratchet wheel 12 is stepped when the Magnet M—A is energized (magnet driven) and not as in type a, when the magnet is de-energized. When M—A is energized, armature 8 which is pivoted at 9 is attracted to M—A causing pawl 10 which is pivoted at 11 to engage the tooth directly below it on ratchet wheel 12 causing the wheel to make one step in a counterclockwise direction. As knob 13 and contact arm 14 are connected to the same shaft 17, as is the ratchet wheel 12, they too are caused to make a partial rotation. This type of switch also acts as a counter. The knob 13 will indicate on the stationary dial 91 how many more steps the switch has to take before the contact arm comes in contact with the first contact on the wafer, in this case the contact connected to wire 61.

The normal position of armature 8 and pawl 11 are such that they remain out of the way of the ratchet wheel teeth. The armature is held in the upper position by a spring (not shown). This enables the knob 13 to be turned by hand, causing 17, 12, and 14 to rotate with it enabling the counter to be set by hand. This determines how many times M—A has to be energized and de-energized before the circuit 14, 61 is completed. The ball 15 is held against the ratchet wheel 12 by spring 16 in such a way as to allow the ratchet wheel to be rotated in a counter-clockwise direction by the stepping mechanism or to be rotated in either direction by the knob 13. The diameter of the ball 15 should be greater than the depth of a ratchet tooth, so that the ball does not jam against the tooth's surface. The ball and spring mechanism allows for only discrete steps of the switch. Therefore, the knob 13 will always point directly at a number on dial 91 after the switch has been stepped.

This type of rotary switch acts as a resettable counter which closes a contact upon reaching the zero position. On some portions of this circuit, the counter will have as its final position a minus one position, so that it will close another circuit when the magnet is energized after the counter has reached zero position. Such switches can be seen in Fig. 4.

OPERATION OF THE SELECTOR BANK

In Fig. 1b, it will be noted that when R–1, R–2 and R–3 (the contacts of which may be on one relay, are shown here as three relays for ease in circuit comprehension) whose coils connected in parallel with L–1 are un-energized, the paths of wires 18 and 19 at the left are made through 20 and 21 out to the right through the contacts of R–2 and out through the wire 22 and 23, respectively. Only when these relays are energized does the selector bank play any part in the operation of the machine. When R–1, R–2, and R–3 are not energized, the bank is said to be inoperative and acts as if it were not connected in the machine circuit. When a potential is applied to 62, relays R–1, R–2, and R–3 are energized and L–1 on a panel is lit indicating that the bank is operative. When a bank is inoperative, its rotary switch W–1, W–2, M—b, 1, 6, 3, 4, 2, 7, 31, 5, W–3, W–4, and W–5 will be in the normal position, contact arms touching C–1, as in W–1. To cause the bank to be operative, a potential is applied to 62 and R—T and R—N relays are assigned to the bank. They are connected as shown in Fig. 1b.

A potential on 18 appears on the contact arm of W–1, energizing relay RT–1, causing the potential on wire 24 to appear on wire 25, energizing R–4, simultaneously the input wires to RT–1, 26, 27, and 28, to be called RT input lines are connected to C–1 of W–2 through wire 35 to 29. At this point, the selector bank can act in one of two modes of operation. One mode will occur if there is a potential on any of the RT input lines of the RT relay energized and the other mode will occur if there is no potential on any of the RT input lines upon the energizing of the associated RT relay. The former mode will be assumed.

Upon the energization of RT–1, a potential will appear on 35 and 29. This will cause a current to flow through the wire 35, C–1 of W–2, 29, through the upper arm of R–5 through interrupter contact 6, through 1 to M—b and to ground, therefore energizing M—b causing the rotary switch type a, to take a step, switch operation heretofore described, moving all the contacts of the associated wafers to their next clockwise position, to their respective contacts C–2. Upon reaching C–2, the contact arm of W–1 which still has a potential on it would now cause RT–2 to be energized. Relay RT–1 de-energized when the contact arm moved from C–1 to C–2. When the contact arms of RT–2 are closed, the RT input lines of RT–2 are connected through wire 37 to wire 29, at this point either of the two modes of operation will take place, depending upon whether or not there is a potential on any of the input lines of RT–2. It must be noted that R–4 was de-energized for an interval when the contact arm of W–1 was moving from C–1 to C–2. The RT and R–5 relays are fast opening and fast closing relays, while R–4 is a slow closing and fast opening relay. When R–4 is energized, upon closing, it energizes R–5. Upon the stepping of the rotary switch, the RT relay must be un-energized, R–4 open, and R–5 open in the time it takes the contact arm at W–1 to move from one contact to the next. Should there be a potential on an RT input line, the rotary switch will have an opportunity to step upon the closing of the contacts of the RT relay before the contact arm of R–4 is closed and the upper arm of R–5 is swung down, disconnecting wire 29 from contact 6. This indicates the need for a slow closing and fast opening relay —R–4.

The second mode of operation of the selector bank will now be assumed, no potential on the RT input lines. Starting from its normal position, with the contact arms on contacts C–1; when the rotary switch is in this position, the bank is said to be zeroed. We will assume the bank is zeroed, a potential is applied to 18 and the bank is operative. A potential appears on the contact arm of W–1 and 63 causing RT–1 to be energized connecting 26, 27, and 28 to be connected with 35 and 29. A potential from 24 causes R–4 to be energized on the closing of the contacts of RT–1. As there is no potential on 29 now, the rotary switch does not step, R–4 has time to close, energizing R–5. When R–5 is energized, 6 is disconnected from 29 and a potential is placed on 29 from the wire 30. The relay RT–1 remains closed, therefore a potential appears on all the RT lines associated with RT–1. Upon the energization of R–5 wire 42, which usually carries a potential, discussed in Control circuits, is connected to wire 41. As the bank is operative, the potential appears on 22 which is connected to 18 of the bank 1c; therefore, if bank 1–c is operative, a potential will appear on the arm of W–1c and that bank will start operating. This action at R–5 being energized and remaining that way applying a potential to 22 is called settling down. The arm of W–5 is connected to the D. C. positive terminal. Therefore, when the bank settles down on a contact a potential will appear on one of the section indicating lines, P–32, P–36, or P–40. The associated RN relay will connect certain P wires to wire 43, depending upon which contact the rotary switch settles down on; and upon the jumpers used, to the right of the RN relay stationary contacts, in connecting the P lines to wire 43. R–3 is used to disconnect RN–1 from a potential source when the bank is zeroed and inoperative; therefore none of the P associated with the bank will be connected to wire 43 or have a potential on them, when the bank is inoperative and zeroed. After the bank has settled down the only way to cause the rotary switch to step is to apply a voltage to point 4, at point 23 if the bank is operative, or at 77. Should it be desired to set the rotary switch to the normal zeroed position it would be necessary only to apply a voltage to wire 47. If the contact arm of W–3 is not on contact 1, it will connect 6 through a rectifier 48 to the voltage source, thus causing the switch the keep stepping until the arm of W–3 was on C–1, thus removing the potential from point 6. This stops the switch at the zeroed position. Rectifier 48 prevents any flow of current from 6 into wire 47 so that the selection operation of one bank does not interfere with other banks selection as they all have a common wire 47. This makes it possible to have the banks act independently and still have a common zeroing line. It is necessary that this potential remain on 47 until the bank returns to the zeroed position. When a potential appears on 47 of one bank, it appears on 47 of all the banks and the potential must remain there until all the banks are zeroed. It will be noted that R-6 is energized and L-2 is lit, only when the bank is zeroed. Therefore, the control circuits explained hereafter will keep a potential on 47 as long as there is any direct connection between wires 49 and 50 through any relay R-6. All the banks would have to be zeroed before all the R-6 relays were energized and therefore would leave no direct path between 49 and 50. Then and only then will the potential be removed from 47, this is the method used in resetting all the selector banks of the machine.

It will be noted that W-4 allows the magnet M—b to be put in parallel with the magnet of the proceeding bank in this case M—a, as 19b is connected to 23—a. When the bank is on its last contact of rotation before being zeroed, both of the stepping switches will step one position upon the application of a potential to 6—b. We see that for every complete rotation of a rotary switch, the next operative rotary switch to the left will be caused to take at least one step. This connection enables the banks to investigate all possible combinations of RT relays without potentials on their RT input lines. The selector banks act like the mechanical counter wheels of the type used as a mileage indicator in an automobile speedometer. For every rotation of the rotary switch of a bank, the bank adjacent to it, to the left, makes a step to the next RT relay with no potential on its RT input lines.

THE SELECTOR BANK CONTROL CIRCUITS

The control circuits Fig. 1a contain buttons and switches which control the starting, stopping, the continuation after stopping, and the reset circuits of the machine. The selector bank portion of this circuit acts exactly like that of the selector bank b with the exception that there is one more position, contact, CO, on each wafer of the spring drive type a rotary switch than there are on the other selector bank rotary switches. In this diagram the RT and RN relays are not shown, but they are connected in the same manner as shown in Fig. 1b. This bank is zeroed when the contact arms are on CO; at this position R-6a is energized, the lower arm of which serves the same purpose as the arm of relay R-6b, opening a path between wires 49 and 50. In bank a when rotary switch 1a is zeroed, L-2 indicates on a panel that the bank is zeroed and L-1 indicated whether the bank is occupied or not. In assigning the RT and RN memory relays to each bank one group is connected (by a circuit explained hereafter with the aid of the circuits shown in Figs. 4 and 5) to bank a, the next to bank b, the next to bank c and so on. As each bank is assigned a group of RT and RN relays, a potential is applied to its contact 62, energizing its relay R-1, R-2, and R-3 also lighting L-1. The machine would not function unless at least one bank was assigned a group of RT and RN relays. Since the RT and RN relays are assigned in the order of bank rotation, to a, then to b, the third to c and so if only one group is assigned by the switching circuits of Figs. 4 and 5 will be assigned to bank a. Therefore, there is no reason to have any relays such as R-1, R-2 and R-3 as bank a would always be operative.

It was stated in the description of the operation of bank 1b that only when a potential appeared on 18 of the bank will it operate. This happens when the previous bank settles down, in the case of bank a, there are no previous operating banks. Bank a would be the first to start operating, therefore the contact arm of W-1 is connected directly to wire 42 instead of going through a contact of a R-5 relay to wire 42. This arrangement allows bank a to operate immediately upon the starting of the machine. Before the machine is started, it is necessary that certain conditions be met. The proper RT and RN relays must have been assigned to the various selector banks; those banks assigned RN and RT relays must have a potential placed on their respective 62 contacts, and a potential must appear on all wires 42.

STARTING

To start the machine a potential is applied to M—a for a short time by means of applying a voltage to 67 and R-7 simultaneously by depressing B-1, the start button. It will be noted that a potential from 68 appears on 69 only when R-6 is energized; this only happens when bank a is zeroed. Since R-7 attracts the armature of R-7, a slow closing relay, a short time after R-7 is energized the circuit 66, 67 is broken, shortly after B-1 is depressed sending only a short pulse of current through M—a. Rectifier 65 prevents R-7 from being energized every time M—a is energized in the normal operation of the selector bank. Now that this bank has stepped one step from its zeroed position, the contact arm at W-1a is on C-1 energizing the RT-1a thus causing the selector switch to start its search for a contact which is connected to a RT relay with no potential on its RT input lines.

Upon the settling down of the first bank, a potential will be applied to 18 of the next bank and that bank will search until it finds a contact connected to an RT relay with no potential on its RT input line. Upon finding that RT relay, the bank will settle down, causing the next bank to operate and so on until all the operative banks have settled down, causing a voltage to be applied to wire 22 of the last operative bank. This will apply a potential to wire 51 (see Figs. 1b, 2, and 11). This searching process would continue until the potential is removed from wire 42. If the potential was removed from wire 42, all the energized RT relays would be de-energized and all selection would stop. Upon the application of this potential to 42, the process would continue from where it had left off when the potential on 42 was removed. It will be seen in Fig. 1a that 42 is connected to the potential source 68 through the lower contact of R-8, therefore when R-8 is energized, the circuit 68, 42 will be broken and the machine will stop. When R-8 is de-energized, the machine will continue from where it left off. When the stop button B-2 is pressed, a circuit is made from 68 to 70 causing current to flow through the coil of relay R-8, if R-10 is un-energized, to ground. This causes the arms of R-8 to swing down, breaking the circuit 68, 42 while making the circuit 68, 70 through the upper arm of R-8. This causes the relay R-8 to remain energized even after B-2 is released. As L-3 is in parallel with R-8 it will light, thus indicating that the machine has stopped operation. By depressing and releasing B-2, the machine will stop and remain stopped until R-10 is energized. The circuit 68, 70 can be made by either B-2 or by R-9.

CONTINUING

When R-10 is energized for a short while, the holding circuit of R-8 is broken and the arms at R-8 will swing up and remain up, applying a potential to 42 allowing the machine to continue its operation from where it left off. If R-18 is not energized the pressing of B-3 will apply a potential to 72, 71 and thus energize R-10. If R-18 is energized, the pressing of B-3 will put a potential on 72 causing a chime 73 to sound. This chime will sound as a warning that the machine is not supposed to continue. There are two conditions in which this will happen.

One condition is that the machine has investigated all possible combinations of RT relays without potentials on their RT input lines, meaning that rotary switch has returned to its normal position, energizing R-6a, its middle contact arm making circuit 68, 78 through R-18.

Figure 2:
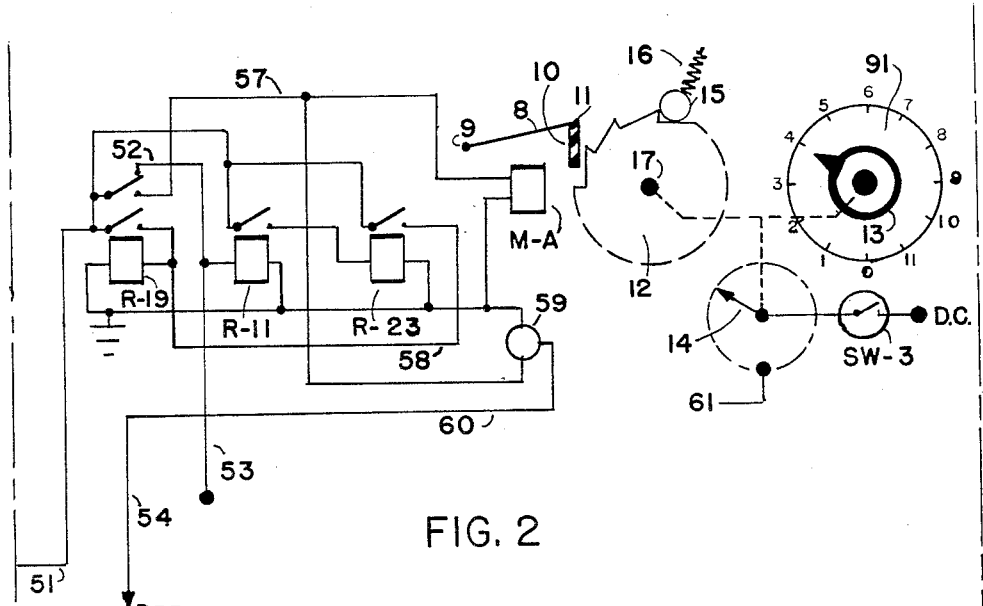
Figure 2 is a circuit showing the card counter mechanism and a portion of the card punching circuit.

R-18 will be energized when arm 14 of Fig. 2 makes contact with 61 if SW-3 is closed.

RESETTING

By depressing B-4, the reset button, or by energizing R-12 a potential is applied to 49. If any of the R-6 relays are not energized, meaning that their respective banks are not zeroed, then a potential will appear on 50 energizing R-13 causing the circuit 68, 49 to be made through the lower arm of R-13. Therefore, if the circuit 68, 49 is made by R-12 or by B-4, the relay R-13 will remain closed as long as an R-6 relay is un-energized, making a direct path between 49 and 50. While R-13 is energized potential appears on 47 through the upper arm of R-13 from the potential source 68. The potential on 47 cause the resetting indicator to light, and thus as described in the operation of selector bank b, the banks are caused to step until they reach their zeroed positions. Upon reaching their respective zeroed positions, their R-6 relays are energized. The circuit 49, 50 is broken when all R-6 relays are energized, R-13 is thus de-energized, the potential being removed from 47. The potential will not return to 47 until B-4 is pressed or R-12 is energized for a time long enough to let the contacts of R-13 close. If a potential should appear on wire 61, it will cause a potential to appear on 75 until R-14 is energized. R-14 will not be energized until R-15, then R-16 are energized. This is longer than the time taken for R8 to be energized and remain energized by its self energizing circuit 68, 70. Thus a potential appearing on 61 will cause the machine to stop. If SW-1 is closed, R-12 will be energized long enough to allow R-13 to self energize through the circuit 68, 49, 50, causing the machine to reset. When SW-1 is open, the machine will stop when a potential is placed on 61. When SW-1 is closed, the machine will stop and reset when a potential is applied to 61. We then call the position of SW-1 when open the automatic stop position and when closed the automatic stop and reset position. A potential will appear on 86 for a short while upon an application of potential to 61 if SW-2 is closed, causing the memory circuits, discussed later (see Figs. 4 and 5) to be reset. Rectifier 74 is used to prevent the circuits, in conjunction with wire 86, from causing the machine to stop. When a potential appears on wire 61, either from 14 (see Fig. 2), or R-6a, it not only energizes R-18 as discussed in the description of the Continue circuit, but also energizes R-15 through wire 75 causing a potential to appear on R-9 etc. as just discussed. R-15, a slow closing relay, causes R-16 to be energized then causing the circuit 61, 76, the R-14 self energizing circuit, to be made through the lower arm of R-14 at the same time removing the potential from 75. The arms of R-14 swing down before R-16 opens, due to the delay caused in the opening of the contacts of R-15 and R-16. It can be seen that a potential appears on 75 only during the time it took for R-15 and R-16 to close. This time is longer than it takes R-9 to cause R-8 to self-energize and longer than it takes R-12 to cause R-13 to self-energize. The machine can be made to stop and reset after a certain number of energizations of M—A (Fig. 2) if SW-3 is closed. The machine can be made to stop and reset when the RSW1a returns to its zero position after exploring all the combinations of RT relays without potentials on any of their respective RT input lines. Should all possible combinations of RT relays without potential on any of their RT input lines be desired, and this number of combinations should exceed the capacity of the counter shown in Figure 2, the SW-3 is opened so that no potential appears on 61, even though the counter returns to the zeroed position. Therefore, the machine will not stop and reset until RSW—a returns to its zeroed position.

PUNCH AND PROGRAM COUNTER CIRCUITS (Fig. 2)

Figure 8:
Figure 8 is a fragmentary circuit of the punch circuit.
Figure 9:
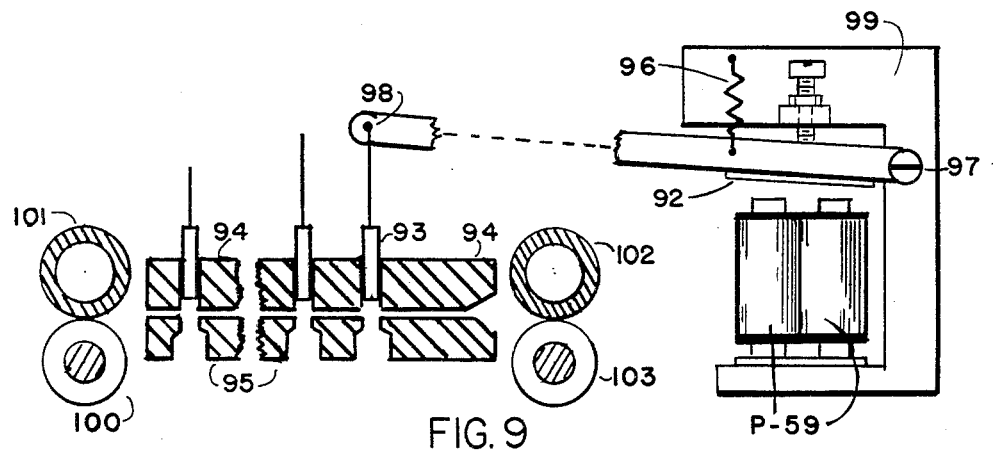
Figure 9 is an outside elevation of the punch mechanism.

When bank a settles down, a potential appears on 41a, 18b causing bank b to search, upon the settling down at bank b a potential appears on 41b causing the next bank to operate. This continues until all the operative banks have settled down. Upon the last bank settling down, a voltage appears on its wires 41 and 22 which causes a voltage to appear on wire 51 of Fig. 2. When a potential appears on wire 51, it also appears on wire 52. As R-19 is un-energized, this causes R-11 to be energized and sends a current along wire 53 which is connected to wire 82 of R-24 (Fig. 8) causing R-24 to be energized. R-11 and R-23 are slow closing relays. Thus, by the time R-11 causes its contact to close causing R-23 to be energized, causing its contact to close energizing R-19 and breaking the 51, 52 contact; R-24 had time to cause all its contacts to close, grounding all the B wires of the punch magnets from P-1 to P-46 at the same time a potential is applied to wire 43, thus energizing any of the punch magnets P-47 through P-62 that are connected to wire 43 through the contact arms of the RN relays; the B wire at punch magnets P-47 through P-62 are connected directly to ground as illustrated by P-56 (Fig. 8) upon the energization of the punch magnets the punch armature 92 of Fig. 9 is attracted downward, pivoting at 97, causing the punch rod 93 pivoted at 98 to punch a hole in the card (Fig. 6) which would be in the space between the rod guide 94 and the die 95. The potential remains on 53 long enough for the punches to operate, the delay caused by the successive closing of R-11 and R-23, upon the energization of R-19 the potential would be removed from 53, the punch magnets would be de-energized and the spring 96 would cause the punch armature and punch rod to return to their normal positions against the adjustable stop screw of the punch frame 99. When the relay R-19 is energized the circuit 51 to 58 is made by the lower arm of R-19, before the arm of R-23 has time to break its contact thus applying a potential to R-19 through the lower arm of R-19 causing R-19 to remain energized as long as a potential remains on 51. Upon the energization of R-19, M—A is energized by a current flowing through 51 and 57. This causes the rotary switch to step one step, as described in the description of type b rotary switch at the same time causing a potential to be applied to 59. 59 is a mechanism that removes the card (Fig. 6) from between the rod guides 94 and die 95 of Fig. 9 and replaces by another card, unpunched. Such a mechanism may be a Geneva wheel geared to wheels 100, 101, 102 and 103 of Fig. 9 by means of a magnetically operated clutch which enables the Geneva wheel to cause the wheels 100, 101, 102 and 103 to turn enough to remove one card from the punching space between 94 and 45, and replace it by an unpunched card. Upon the removal of the punched card and the positioning of a new one, the wheels 100, 101, 102 and 103 stop and a potential is applied to wire 60 of Fig. 2. This may be done by having the wheels above described geared to a cam which would operate a switch which would connect wire 57 to that of 54 of Fig. 2. Rectifier 55 would prevent the potential appearing across the M of the last selector bank from affecting the circuit of Fig. 2. When the potential appears on 56, which is connected to 23 of the last operative bank, the rotary switch of that bank is caused to be stepped and the search for a contact associated with an RT relay which has no potential on its RT input lines is continued. The time of return to their normal position of R-19, R-11, R-23 and M—A should be less than the time taken by the last selector bank to settle down on its very next contact. It can now be seen that a potential does not appear on 51, until all the operative selector banks have settled down. When this happens a card is punched, ejected and an unpunched card is moved into position under the punch rods.

TIME UNIT LINES CIRCUITS

The duration for which the program to be produced covers is divided into time units. In the example of a university, the duration of the program is one week. The week will be divided into thirty time units. These are represented by the thirty squares of the left section of the program card shown in Fig. 6. For convenience they will be numbered consecutively across. Monday 9–9:30 will be numbered 1; Friday 9–9:30 will be numbered 5; Tuesday 11–12 will be numbered 17; Friday 2–2:30 will be numbered 30. Each time unit has a wire associated with it called a time unit line (see Fig. 3). Associated with each time unit line is one locking relay and one push button, one lamp and one punch. The time unit lines are numbered with the same number as their associated punches. It will be noted of TUL–2, Fig. 3, that when RL–2 is unlocked TUL–2 is connected directly to P–2A. Therefore, if there were a potential on TUL–2 and RL–2 was in its unlocked position P–2 would be energized upon the energization of relay R–24 (Fig. 8) and thus a hole would be punched in the space designated Tuesday 9–9:30 in the program card shown in Fig. 6. If B–102 were pressed RL–2 would be energized causing RL–2 to have its contact arms lock in a downward position causing lamp L–102 to light, connection TUL–2 to a potential source, 83 and disconnecting P–2A from TUL–2. In this case if R–24 were energized P–2 would not be energized and no hole would be needed in the card of Fig. 6 in the space Tuesday 9–9:30. 84 is the release magnet which upon its energization would unlock any locked relay RL–1 through RL–15. This is accomplished by pressing the button B–10, by energization of R–17. Both release magnets, 84 and 85 are energized when R–17 is energized causing any of the time unit line locking relays, RL–1 through RL–30 that are locked to become unlocked. R–17 may be energized if SW–4 is closed, connecting R–17 to wire 75 of Figure 1a. Therefore, when the selector banks are reset, the locked time unit line relays can be unlocked simultaneously provided SW–4 is closed.

SUBJECT SELECTION CIRCUITS

As was described in the introduction, there are four conditions of consistency that must be met in the formulation of a program.

1. No two classes meeting at the same time are assigned for one program.
2. No class is assigned that meets at the same time the registrant wishes to be free.
3. No class that has been filled is assigned to a program.
4. One section from each subject desired is assigned to each program.

The meeting of the first condition will be discussed. If all but one of the RT lines of RT–1, Fig. 1, were connected to certain time unit lines, the selector bank 1–b would settle down on C1 if there were no potential on any of these associated time unit lines. Upon the settling down of selector bank b, a potential would appear on all the time unit lines associated with RT–1, therefore the succeeding selector banks could not settle down on a contact associated with an RT relay that was connected to a time unit line connected to RT–1. As each RT relay represents the times of the week a section meets, it is connected directly to those time unit lines associated with the time units at which that section meets. Each RN relay represents the code number, in the binary system, of the section mentioned above. The two relays, one RT and one RN, which represent the meeting times and code number of a section are said to be the set of relays representing that section. As each subject contains many sections a few sets associated with one another would represent the meeting times and code numbers of the sections of that particular subject. These combined sets will be called a group. In the simplified machine herein described, each group can be composed of no more than three sections, three contacts on the selector bank rotary switches, each section cannot occupy more than two time unit lines. As stated, all but one of the RT input lines are connected to time unit lines. There cannot be more than eight sets in the permanent memory of the machine as the highest binary number that can be set up with four RN contacts and their associated jumpers (see Fig. 1b lower right), is 1111, the first hole is used as a check so the highest code number which can be punched is 111 or 7 in the decimal system. To make a selector bank represent a subject we need only assign to that selector bank the group which is composed of the relays associated with the sections of that subject. Let it be said that the group assigned to the selector bank in Fig. 1b were to represent the sections of Physics course, subdivision quantum mechanics, noted as Phy. 3, the section a of which met 10 to 11 on Monday and 10 to 11 on Friday. The code number of the section is 1 in the decimal system or 0001 in the binary system of numbering. Therefore the punchers would punch 1001, 1 representing a hole and 0 representing no hole (see jumpers of RN–1). We would then have RT input line 27 connected to TUL11, RT input lines 28 would be connected to TUL15. The second section of Physics 3 is Phy. 3b which meets from 10 to 12 on Tuesday, code number 2 or 010 in the binary system, therefore 1010 would be punched. 33 would be wired to TUL12 and 34 wired to TUL17. The third section or Phy. 3c meets from 10 to 11 and from 1 to 2 on Thursdays, code number 3 or 011 in the binary system, 1011 punched. In that case 39 would be wired to TUL14 and 40 would be wired to TUL29. The RT relays and RN relays of Fig. 1b are connected by a switching system hereafter described that will allow this group to be connected to any selector bank; the dotted lines AB and CD represent the point where the switching system is interposed. For each section of a subject there is one RT and one RN relay. They represent the permanent memory of the machine. The RT relays are wired such that they are connected to the time unit lines representing the time units of that section and the RN relays are wired such that they have jumpers on certain punch lines so that holes can be punched in the card (Fig. 6) representing the code number of that section. If there were only 2 sections represented by a group of relays the wire 64, 46, 59, 39 and 40 would be missing; wire 38 would go directly to a D. C. source.

RT and RN assignment circuits

Figure 4:
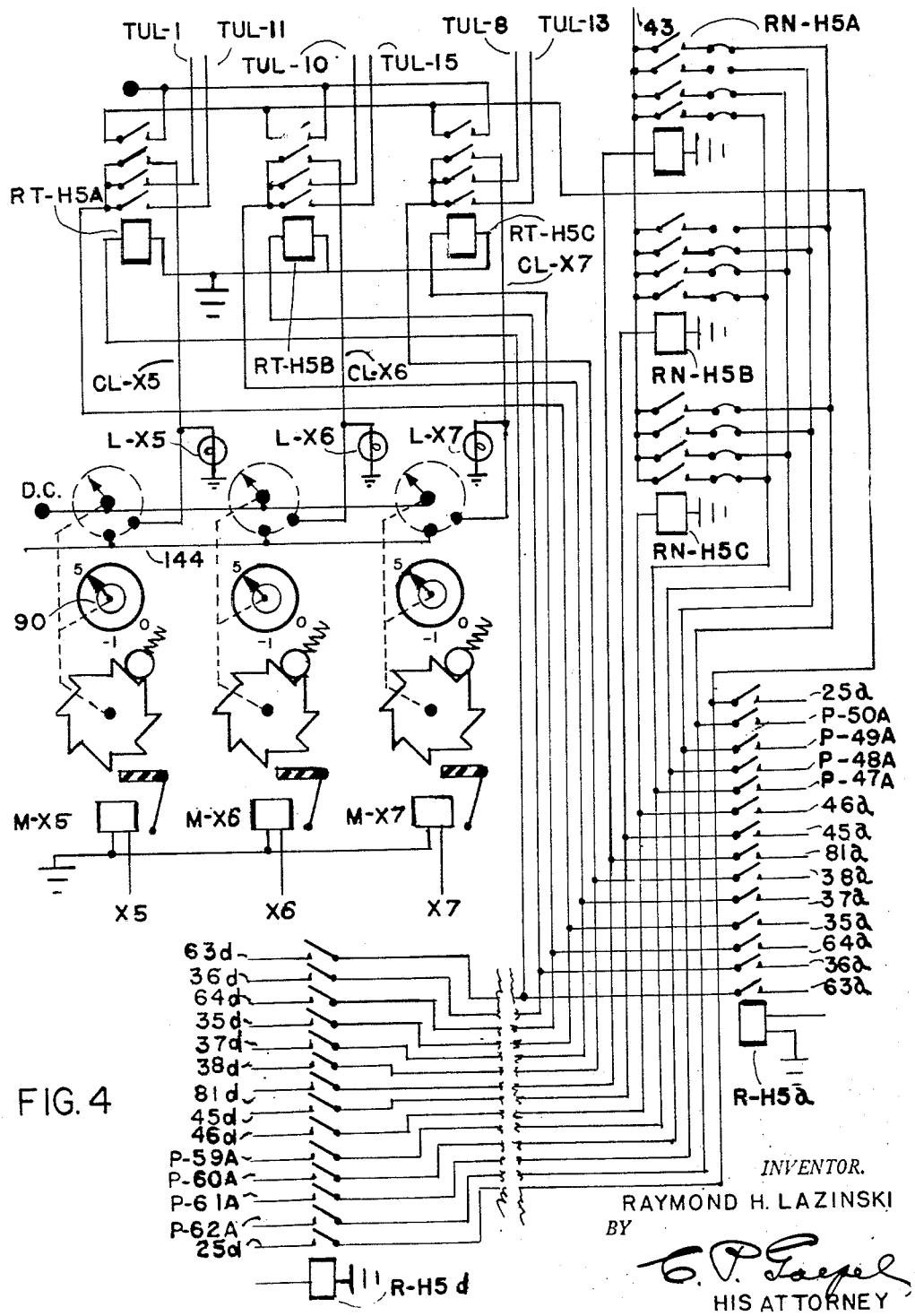
Figure 4 is a circuit diagram of a portion of the permanent relay memory and a portion of the group assignment circuit.
Figure 5:
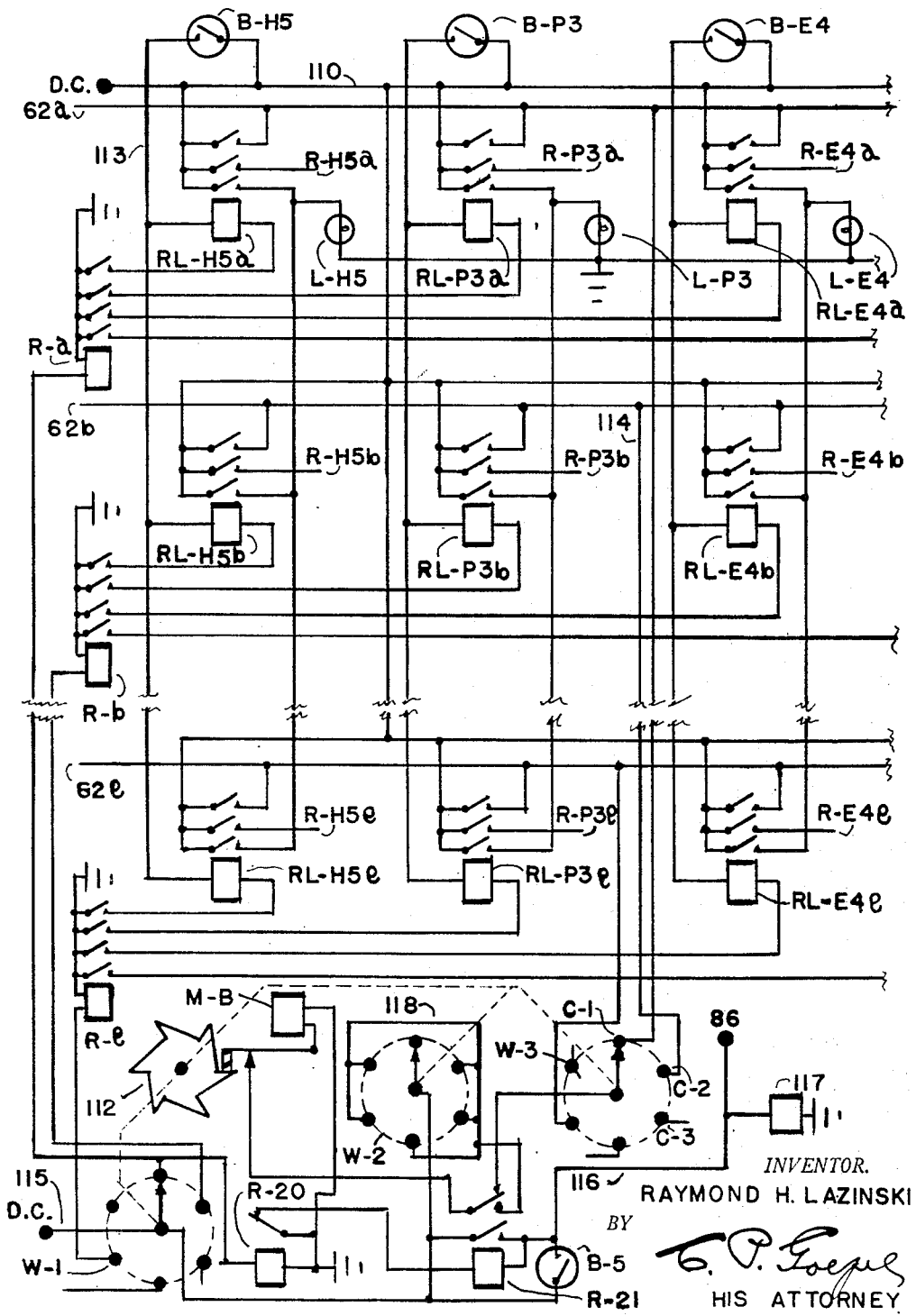
Figure 5 is a circuit diagram of the subject selection circuit which is a portion of the subject assignment circuit.

In Fig. 4 is the circuit for sections of Modern History, subdivision European, noted as H5, section a meeting 9 to 9:30 and 10–11 Monday, section code number 5, 1101; section H5b meeting 9:30–11 Friday, code number 6 or 1110; section H5c meeting 9:30–11 Wednesday, code number 7 or 1111. By energizing R—H5a (Fig. 4) group H5 is assigned to bank a. By energizing R—H5b group H5 is assigned to bank b, and so on; there is one assigning relay connected to each group for every selector bank in the circuit. In Fig. 4 only 2 of the many assigning relays are shown, that which assigns group H5 to bank a and that which assigns group H5 to bank d. It must be remembered that two assigning relays of the same group cannot be energized at the same time; thus preventing the same group from being assigned to 2 different selector banks at the same time. No two assignment relays associated with one selector bank can be energized at the same time, thus causing two different groups to be assigned to the same selector bank. This circuit is shown in Fig. 5. Each subject has a button and a lamp. The first subject button pressed assigns the group of relays representing that subject to bank a, the second subject button pressed assigns the group associated with that button to bank *b*. The number of subjects that can be assigned to the selector banks is equal to the number of selector banks of the machine. It will be seen that when a group is assigned to a bank the wire 62 of that bank has a potential placed on it thus making that bank operative. The circuit shown in Fig. 5 will accommodate the assignment of five groups to five banks. In this circuit there are only 4 subjects to choose from, the assignment circuits of three are shown. By adding more contacts to the relay, R*a*, R*b*, R*c*, etc., the subject capacity of the machine can be increased. The normal position of RSW—B, composed of W1, W2, W3, 112, at type *a* rotary switch is with the contact arms, pointing vertically to C1. In this normal position R*a* is receiving a potential from the contact arm of W1, causing all the RL relays associated with wire 62–*a* to be grounded. Upon the pressing of a subject button the relay associated with that button will be energized causing that relay to lock and light the bulb associated with the button pressed, thus also causing a potential to appear on 62–*a* (making operative bank *a*). When the above mentioned relay locks, a potential appears on contact 1 of W–3 causing M–B to be energized resulting in the stepping of RSW—B. Upon the stepping of RSW—B from C1 to C2, R*a* is un-energized and R*b* is energized grounding all the RL relays associated with wire 62*b*. It will be assumed that now B–H5 is depressed. This will cause the potential from wire 110 to appear on wire 113, as RL—H5*b* is the only RL—H5 relay that is grounded RL—H5*b* energizes and is locked, placing a potential on wire 114, 62*b* causing bank *b* to become operative, L—H5 to light and as the contact arm of W–3 is on contact 2 of W–3 causes RSW—B to step. When RL—H5*b* locked its middle contact arm applied potential to R—H5*b* assigning the group H5 (Fig. 4) to bank *b*. For ease of understanding contacts 3 and 4 of W–3 and W–1 and their associated locking relays are not shown. It will be noted that after the assignment of subjects groups to 5 banks, the contact arm of W–3 is on contact 6 of W–3 and can receive no potential from a 62 line. No relay receives a potential from the contact arm of W1. It therefore cannot assign another subject. It must be remembered that the number of contacts on a wafer of RSW—B should exceed by one the number of banks of the machine.

Should it be desired to reset the assignment unit, Fig. 5, it is only necessary to press button B–5 thus causing a potential from 115 to appear on 116 causing 117, the release magnets for all the locking relays of the assignment unit of Fig. 5, and R–21 to be energized. Upon the energization of R–21, its lower arm connects 115 to the relay causing it to self energize. The upper arm of R–21 causes the stepping coil MB of RSW—B to be connected to 118. The arm of W2 is connected to 115, the potential source. RSW—B will then step until it is in the normal position. This stepping is exactly like the zeroing of the selector banks heretofore described. Upon the return of RSW—B to normal position relay R–20 is energized causing R–21 to be de-energized. The circuit will then be in the position to assign different subject groups to selector banks. If SW–2 (Fig. 1*a*) is closed and a voltage is applied to 75 the R–21 will be energized as will 117. This causes R–21 to energize itself and the assigning circuit to be zeroed. Rectifier 74 is to prevent the assigning circuit from affecting the selector bank resetting circuit. If SW–2 is closed the assignment circuit will reset when the selector banks are reset. This assignment circuit enables the subjects to be selected for the production of a program.

*Tallying circuit*

It has been shown how the machine can take into account the subject and free time preferences of the registrant and turn out a consistent program meeting 3 of the 4 conditions originally specified as necessary for the formulation of a consistent program. These conditions are:

1. No two classes meeting at the same time are assigned for one program.
2. No class is assigned that meets at the same time the registrant wishes to be free and
3. All of the chosen subjects are represented in each of the programs.

Now the remaining condition of no filled classes being assigned to the program.

Figure 6:
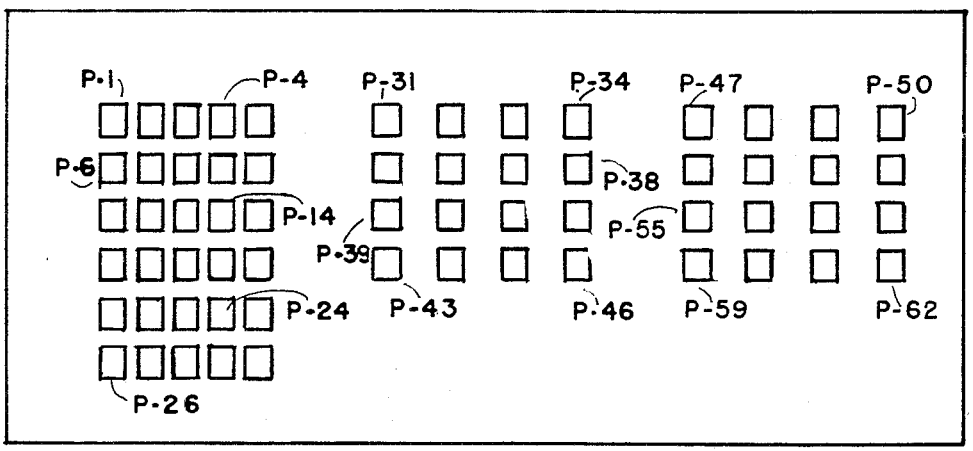
Figure 6 is a diagram of an unpunched program card.
Figure 7:
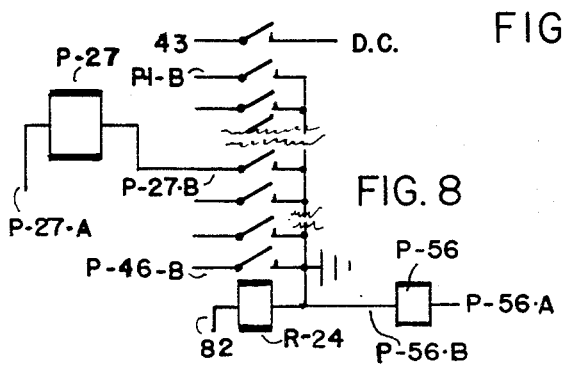
Figure 7 shows the relative position of the punch bars in relation to the outline of the card shown in Fig. 6.
Figure 10:
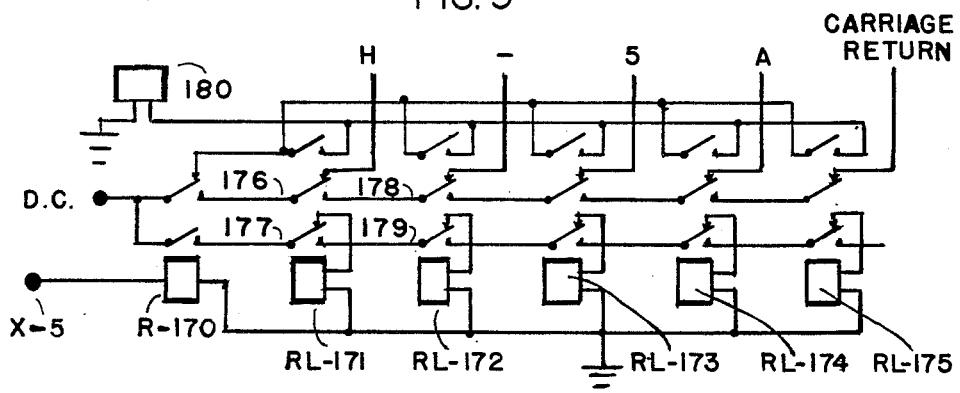
Figure 10 is a fragmentary circuit of the section printing circuit.
Figure 12:
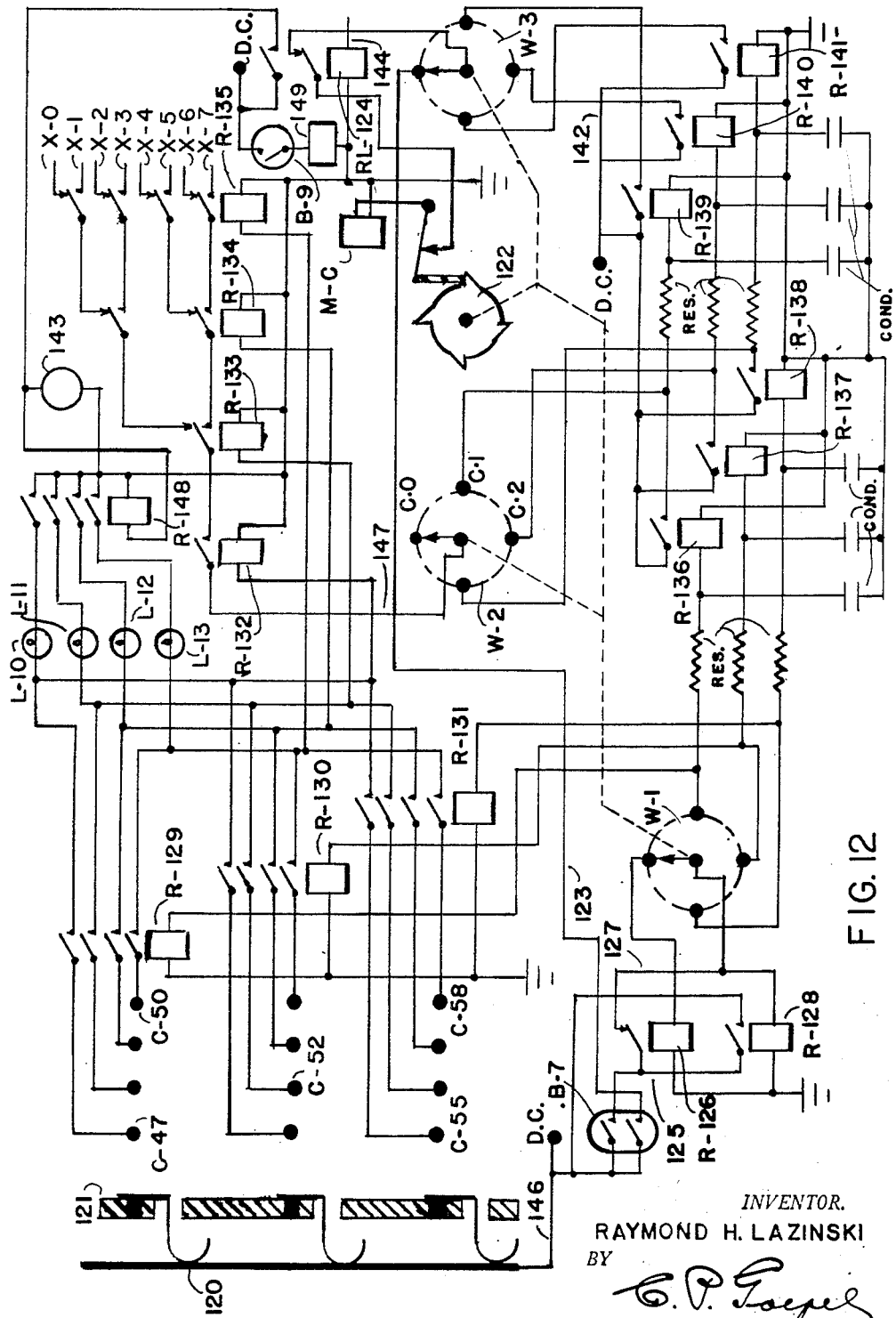
Figure 12 is the circuit of the card reading portion of the machine.

It was noted that each program card (Fig. 6) indicated what hours were spent in class for a particular program by holes being punched in the time unit squares of the left hand section of the card. Where a hole was punched that time unit will be spent in class. The center portion of the card indicates what sections to be registered for to get the program shown in the left section of the card or, in other words, which contacts the selector banks had settled down on when a potential appeared on 51 (Fig. 2). The vertical columns of the central section of the card shown in Fig. 6 represent the subjects chosen by the registrant. The first column would represent the subject associated with the first subject button pressed, the second column would represent the subject associated with the second subject button pressed, and so on. If the button representing History 5, Physics 3 and English 4 were pressed in that order subject column 1 would represent History 5, subject column 2 would represent Physics 3 and subject column 3 would represent English 4. If holes appeared in column 1 row *c*, column 2 row *a* and column 3 row *d* that would indicate the sections represented on that program were H5*c*, P3*a* and E4*d*. In the right hand section of the card were punched the code numbers, in the binary system, of the sections used in formulating the program. The section of History 5*a* on top, then the section of Physics 3 and so on. The order of the section code numbers reading from top down is the same order as the sections indicated in the central portion of the card in order left to right. If the card Fig. 6 were placed in a slot so that the right hand portion were to fit between spring contacts and a conducting plate a circuit would be completed where there was a hole in the card allowing the contact above that hole to touch the plate. Where there was no hole, the contact above that point would not touch the plate. The contacts shown on the left side of Fig. 12 are numbered in the same sequence as are the punches that punch the holes that would fit under those respective contacts (ref. Fig. 7). On the extreme left of Fig. 12 is a side elevation view of the sensing contacts C–47 through C–62 and mounted on insulator 121 making contact with metal plate 120. The card would be inserted on the right side of 120 between 120 and the contacts. The normal position of RSW—C, a type *a* rotary switch, composed of W1, W2, W3 and 122, is with its contact arms on C0. Upon the depressing of B–7 a potential is applied to wire 123 which appears on the contact arm of W–3 causing M—C to be energized if the locking relay RL–124 is not in a locked position. Upon the energization of M—C RSW—C is stepped once. Action of type *a* RSW heretofore described. Simultaneously with the appearance of the potential on 123, a potential appears on 125, 127, and the arm of W–1, energizing R126 and R128. R126 will be energized for only an instant as the arm of W–1 will be on C–1 as soon as RSW—C steps due to the potential on 123. R–126 is de-energized allowing R–128 to be energized by the potential appearing on 146, 125, and 127. As soon as R–128 closes R–128 becomes self-energizing through the contact arm of R–126, therefore R–128 will remain energized after B–7 is released. The contact arm of W–1 is on C–1 energizing R–129, causing the contacts C–47, C–48, C–49, C–50 to be connected to cascade relays R–132, R–133, R–134 and R–135, respectively. Where there is a hole in the card under the sensing contact, the contact will make contact with plate 120 and the associated cascade relays will be energized making a path from wire 147 to an *x* contact. If there appeared holes under C–47 and C–49 only relays R–132 and R–134 would be energized thus making a path from 147 to X2. As heretofore mentioned C–47, C–51 and C–55 are check holes. For the path from 147 to be completed to an *x* contact, a hole must appear in the left column of the right portion of the program card. This prevents the sensing of a card that might have an imperfection or rip in it. The *x* contacts are numbered such that if the binary number read from the right three spaces of a row on the card were sensed the relays R–133, R–134 and R–135 would be set up in such a way as to make a path between 147 and the *x* number in the decimal system represented on the card in the binary system; example, holes under C–47 and C–49 of the right three contacts only C–49 has a potential on it. Energizing R–134 the binary number set up would be 010 where 0 meant no hole, no potential on the sensing contact and the corresponding relay un-energized, and 1 meant a hole, potential on the sensing contact and the corresponding cascade relays energized would represent the number 2. It can be seen from Fig. 12 that if R–132 and R–134 are energized a path will be made between 147 and X–2. Simultaneous with the energization of R–147 a potential is applied to R–136 through a resistor. The condenser across R–136 causes a time delay before R–136 picks up. This time delay should be long enough for R–129 the sensing relay and the proper cascade relay to close before a potential from 142 is applied to C–1 of W–2 and consequently to wire 147 and to the *x* contact the cascade relays were set up for. Upon the application of the potential to C–1 of W–2 of RSW—C the condenser across R–139 starts to charge. R–136 picks up after a time delay due to the integrating nature of the resistor condenser combination. This time delay is large enough for R–129 and the proper cascade relays, as indicated by holes in the card being sensed, to pick up. Upon the closing of the contact of R–136 a potential is applied from wire 142 to the resistor condenser combination of R–139 and to C–1 of W–2. As the arm of W–2 is on C–1 a potential is applied to 147 and therefore to the *x* terminal the cascade is set for. After a time interval passes, due to the delay circuit of R–139, R–139 will pick up applying a potential from 142 to C–1 of W–3 through the lower arm of RL–124 to M—C causing RSW—C to step. If a potential appears on wire 144, the alarm line, before R–139 closes RL–124 will pick up and lock causing relay R–148 to be energized and disconnecting M—C from the contact arm of W–3; therefore when R–139 picks up RSW—C will not step. R–129 will remain energized and the appropriate cascade relays will remain closed, when R–148 is energized. R–148 grounds the lamps L–10, L–11, L–12 and L–13 which are connected in parallel with their respective cascade relays. If RL–124 is energized after a potential appears on 147 and before one of the relays R–139, R–140 or R–141 closes the lights L–11, L–12, and L–13 in that order will indicate the binary number the cascade is set for and thus indicate which *x* terminal the wire 147 is connected to. At the same time 143, an alarm bell, will ring. 149 is the holding magnet for RL–124. By pressing button B–9, RL–124 can be unlocked. When this happens the potential on the arm of W–3 will be transmitted to M—C, the RSW—C will step. The sensing of the holes in the right portion of the card (Fig. 6) will then continue until all rows are sensed. For the purpose of ease in understanding the circuit shown in Fig. 12 is set up to read only three rows of holes and has a cascade of only eight X terminals. The X terminals are connected to the counters of the rotary switch as shown in Fig. 4. It will be noted that the relay RN—H5*a* of the H5 set has its jumpers, read bottom up, set up to represent the binary number 101 which is equivalent to 5 in the decimal, the first number of the RN code as heretofore mentioned serves only as a check. RSW–X5 is connected to X–5 of Fig. 12. The RN relay of the H5*b* set is wired for the number 1110 or 110 which is equivalent to the decimal number 6. M–X6 is connected to X–6 of Fig. 12. The RN relay of the H5*c* set is wired for the number 111 or 7 in decimal notation, therefore MX–7 is connected to X–7 of Fig. 12. It can be seen that for every section code number punched in the right portion of the program card (Fig. 6) that is sensed by the card reading circuit (Fig. 12) the M—X associated with that section set will be energized causing the associated RSW—X to step once. The RSW—X, description of type RSW*b* heretofore given, are set at a number representing the number of students that will be allowed to register for a section. Each registrant will receive a number of program cards from the machine. He will select the card presenting the most desirable program. This he will place in the card sensing slot, and then press button B–7. The counters associated with the section numbers coded on the card will each be stepped one step clockwise. After a number of steps, which is equal to the number of students allowed to register for that section, the contact arm of the RSW—X will cause a potential to be placed on the remaining unconnected RT input line of the RT relay of that set. This will cause a potential to appear on the wire 29 of the bank the group is assigned to whenever the RT relay is energized, therefore the machine will not again produce a program card containing that section. The associate L—X lamp will light indicating that the section is closed. If for some reason a card should be introduced into the card sensing slot and the M—X of a RSW—X be energized after that section has been closed a potential will appear on wire 144 causing the alarm 143 to ring and lock RL–124. When RL–124 locks R–148 is energized; this causes lamps L–10 through L–13 to indicate which section is being incorrectly registered for and the stopping of the sensing of the rest of the section code numbers on that card. If it is desired for the program to be typewritten the circuit shown in Fig. 10 will be used. One of these circuits will be connected to each X contact of the cascade Fig. 12. When the potential appears on X–5, M–X5 and R–170 will be energized placing a potential on wires 176 and 177 simultaneously causing RL–171 to lock. During the short interval it takes RL–171 to pick up a potential appeared on wire H. Upon the locking of RL–171 a potential is applied to 178 and 179 causing RL–172 to pick up and lock applying a potential to wire (—) dash. This continues until RL–175 is locked placing a potential on the wire labeled Carriage Return. Upon the removal of the potential from X–5 the potential is removed from 176 and 177 and is placed on 180. This causes the release for relays RL–171 through RL–175 to be energized. Due to the upper arms of these relays 180 will remain energized until all the locking relays are released. This circuit enables a potential to be applied to the proper input contacts of a recording device such as an electric typewriter or card punch. In the circuit shown (Fig. 10) the potential was applied to the relays H, —, 5, A, and then to the carriage return thus printing and/or punching the names of the sections indicated in the right hand portion of the program card sensed.

*Putting information into the departmental program analyzer by means of punch cards*

In the description of the Departmental Program Analyzer and in the Example of a Solution of a Specific Problem to follow the information as to the time the student wishes to be free and the subjects he desires is given to the machine by means of certain buttons being pressed. It is quite possible to have this information fed into the machine by means of sensing the holes punched in cards. By having a circuit similar to that of Fig. 12 with the outputs (X terminals) of the cascade (relays R–133, R–134, and R–135) going to the locking relays of Fig. 3 the different relays RL-1 to RL-30 can be energized and locked by the sensing of a punched card. Each time unit could be assigned a binary code number then the binary code number of the time unit the registrant wished to be free could be punched into the card in the form of holes. The holes would be sensed and the appropriate time unit line locking relays would be energized and locked. Instead of having a permanent memory of relays that would be connected to the selector banks, these relays would connect the bank to the proper TUL lines, CL lines and to the proper punches; each bank would have its own RT and RN relays and the proper TUL lines and CL line would be connected to the RT input lines by means of a cascade (as that composed of relays R-133, R-134, and R-135). Each RT input line would have its own cascade circuit, the single end of the cascade would be connected to the time unit input line and the multiple ends would be connected to the time unit lines. This would be true of all RT input lines of an RT relay but one. The multiple ends of the cascade of this one RT input line of each RT relay would be connected to the CL lines. Therefore by energizing the proper relays of the cascade of each RT input line that RT relay could be connected to the time unit line and CL line of a specific section. By replacing the RN relay's jumpers, each by a single pole single throw relay we could set the binary code number up on each RN relays. Therefore by energizing the proper jumper relays and the proper RT input line cascade relays the RT and RN relays would be connected up and the banks would operate as previously explained. There would be no need for large number of RT and RN relays and there would be no need for the relay assignment circuits shown in Figs. 4 and 5. Energizing of the proper relays can be done by having each relay connected to a contact on an insulating material as shown on the left of Fig. 12. Thus by placing a punched card into the machine and having its holes sensed the machine can be set up to solve a program.

*An example of a solution of a specific problem*

In the previous sections of this description of the Departmental Program Analyzer, the operation of the different portions of the machine has been explained. In the following section the operation of the machine as a whole, solving a problem, will be described with the aid of a sequence diagram Fig. 13. The sequence diagram is composed of Fig. 13a to 13h in the order named from left to right. The sequence diagram shows the order in which the more important relays and other current responsive devices are energized and the periods during which they are maintained in energized condition. The example of the registration of students at an institution of learning will be continued in this example. The registrant's desires are as follows: Free time, 9 to 9:30 on Mondays; 11 to 12 on Wednesdays; 11 to 12 on Thursdays; 11 to 12 on Fridays; and the program produced will contain the subjects History 5, Physics 3, and English 4. The following table will indicate what information the machine holds involving the above-mentioned subjects.

Physics 3. It will be necessary for the operator of the machine to set the analyzer for the solution of the above stated problem, it will be assumed that the machine is ready to receive information and then solve the problem, that is, all the banks have been zeroed, all the locking relays have been released, etc. Before starting the machine on the solution of the problem the preferences of the registrant must be indicated to the departmental program analyzer. It was stated above that the registrant wanted the time units 9 to 9:30 on Monday, 11 to 12 on Wednesday, Thursday and Friday designated as free time, it is then necessary to press the buttons corresponding with these time units on the free time board therefore buttons (Fig. 3) B-101, B-118, B-119 and B-120 must be pressed and released. When they are pressed, relays RL-1, RL-18, RL-19 and RL-20 are energized, lamps L-101, L-118, L-119 and L-120 light; a potential is applied from wire 83 to time unit lines TUL-1, TUL-18, TUL-19, and TUL-20 and P-1A, P-18A, P-19A, and P-20A are disconnected from their associated time unit lines. To indicate to the machine that the programs produced should contain sections from the subjects History 5, Physics 3 and English 4, it is only necessary to press and then release button (Fig. 5) B—H5, then B—P3 and then B—E4. See Fig. 13a for the sequence diagram of the operation of the assignment circuits shown in Figs. 4 and 5. The first subject chosen will be History 5, B—H5 is depressed, as the arm of W-3 of RSW—B is on C-1 R—a is energized, and thus when B—H5 is depressed RL—H5a picks up and locks applying a voltage to 62a, lighting L—H5, energizing R—H5a, (Fig. 4) and causing M—B to step RSW—B de-energizing R—a. R—b is energized, B—P3 is pressed, RL—P3b picks up and locks applying a voltage to 62b, lighting L—P3, energizing R—P3b, and causing M—B to step RSW—B, de-energizing R—b. R—c is energized, B—E4 is pressed, RL—E4c picks up and locks applying a voltage to 62c lighting L—E4, energizing R—E4c and causing M—B to step RSW—B de-energizing R—c. Upon the step taken by RSW—B R—d is energized. Now that the appropriate buttons have been pressed R—H5a, R—P3b and R—E4c will remain energized thus assigning the group representing History 5 to bank a, the group representing Physics 3 to bank b and the group representing English 4 to bank c. Upon the application of a potential on 86 or the pressing of B-5 the assignment circuit will be reset. The actions of the components after a potential is applied at 116 can be seen on the sequence diagram 13a to the right of time interval 39. The interval between the vertical lines marked 36 and 38 is an indeterminate time.

Now that the groups have been assigned to the selector banks the Departmental Analyzer will start selecting programs. It will be assumed that all the banks are zeroed and that there is an unpunched card in the space between 94 and 95 of Fig. 9. It is desired that after four programs are produced the machine will stop, reset its time unit line relays (Fig. 3) and its subject assignment circuit (Figs. 4 and 5). For this procedure to be followed SW-3 (Fig. 2) is closed, SW-4 (Fig. 3) is closed.

TABLE

| Subject | History 5 | | | Physics 3 | | | English 4 | |
|---|---|---|---|---|---|---|---|---|
| Section | a | b | c | a | b | c | a | b, c |
| Meeting times | Mon. 9–9:30; Mon. 10–11. | Fri. 9:30–10; Fri. 10–11. | Wed. 9:30–10; Wed. 10–11. | Mon. 10–11; Fri. 10–11. | Tues. 10–11; Tues. 11–12. | Thurs. 10–11; Thurs. 1–2. | Mon. 10–11; Mon. 11–12. | Thurs. 12–1; Thurs. 1–2. |
| TUL's connected to RT relay | 1 and 11 | 10 and 15 | 8 and 13 | 11 and 15 | 12 and 17 | 14 and 29 | 11 and 16 | 24 and 29. |
| Section number | 5 | 6 | 7 | 1 | 2 | 3 | 0 | 4. |
| Section code | 1101 | 1110 | 1111 | 1001 | 1010 | 1011 | 1000 | 1100. |
| Tally counter reading | 5 | 8 | 3 | 4 | 1 | 0 | 2 | 1. |

Figure 3:
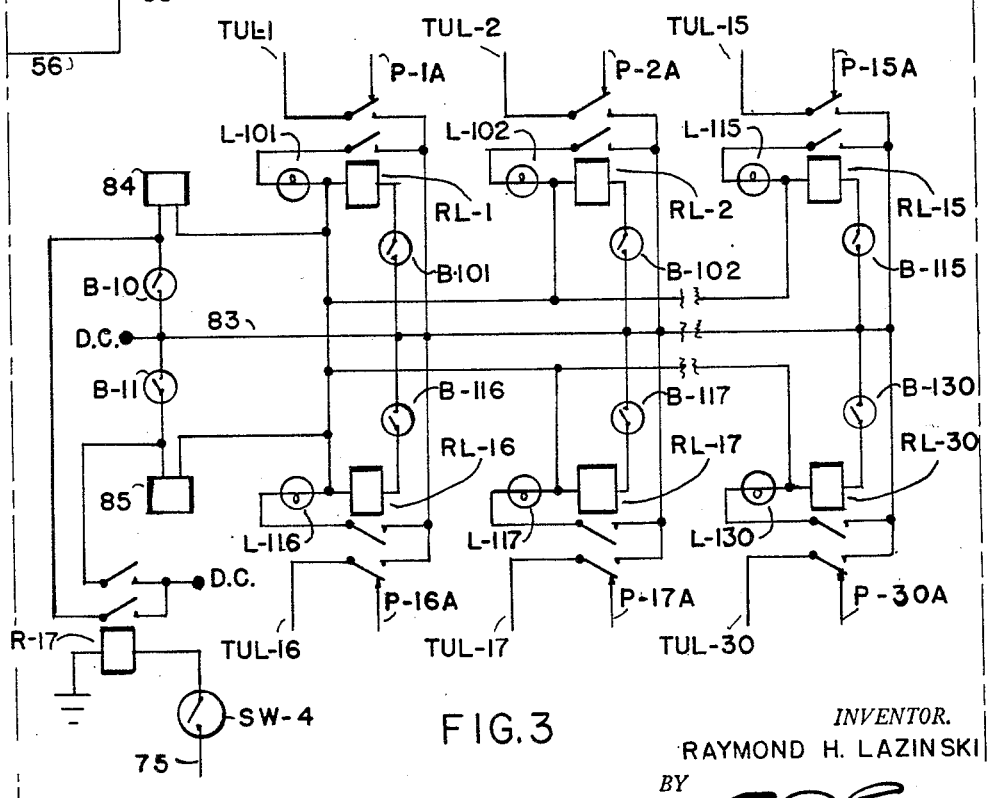
Figure 3 represents the free time selection circuit.
Figure 13A:
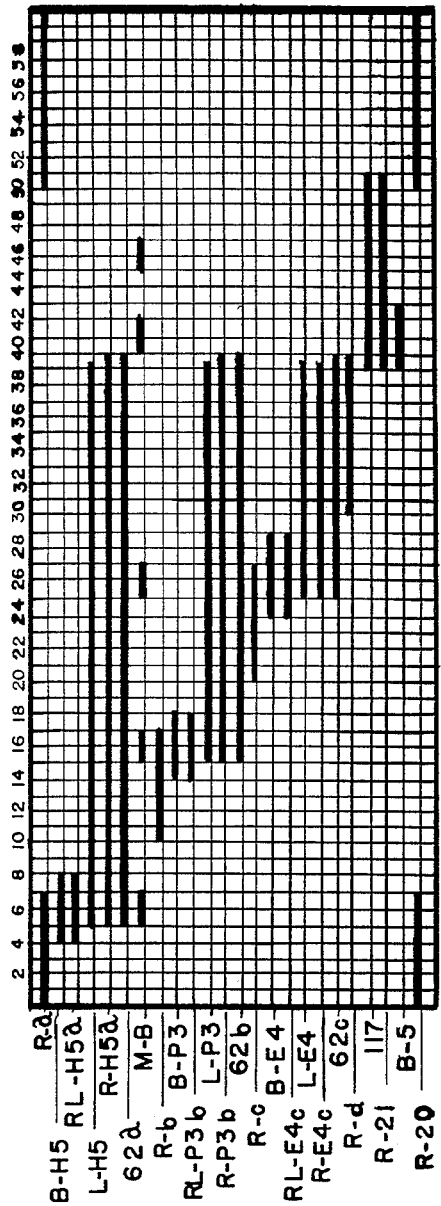
Figure 13B:
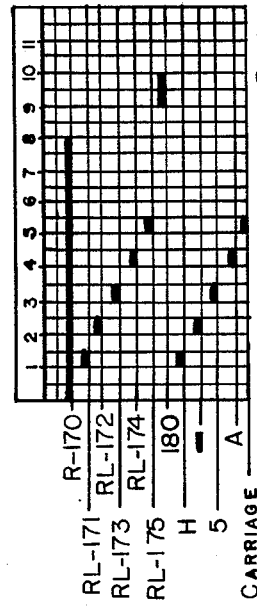
Figure 13B:
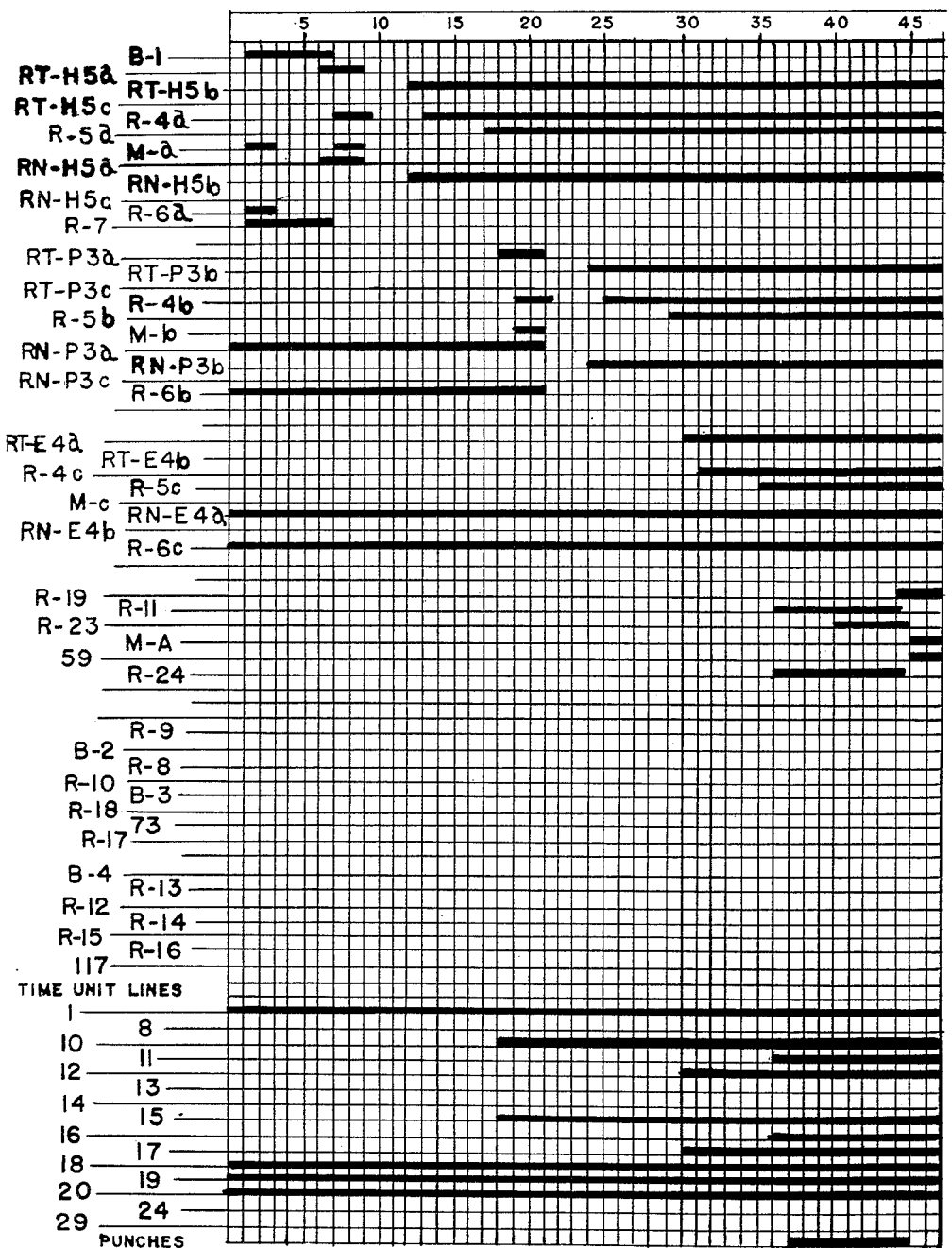
Figure 13C:
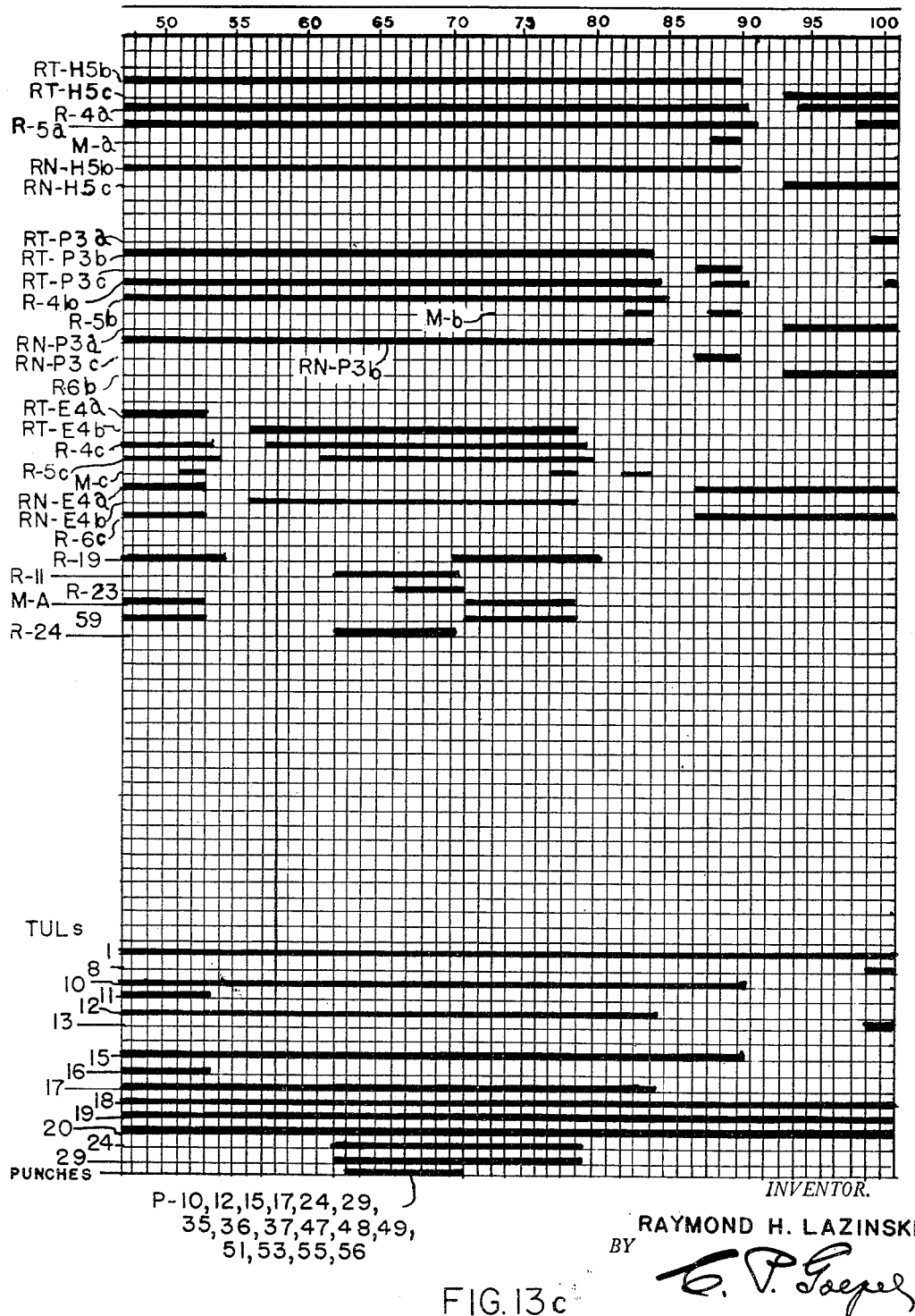
Figure 13D:
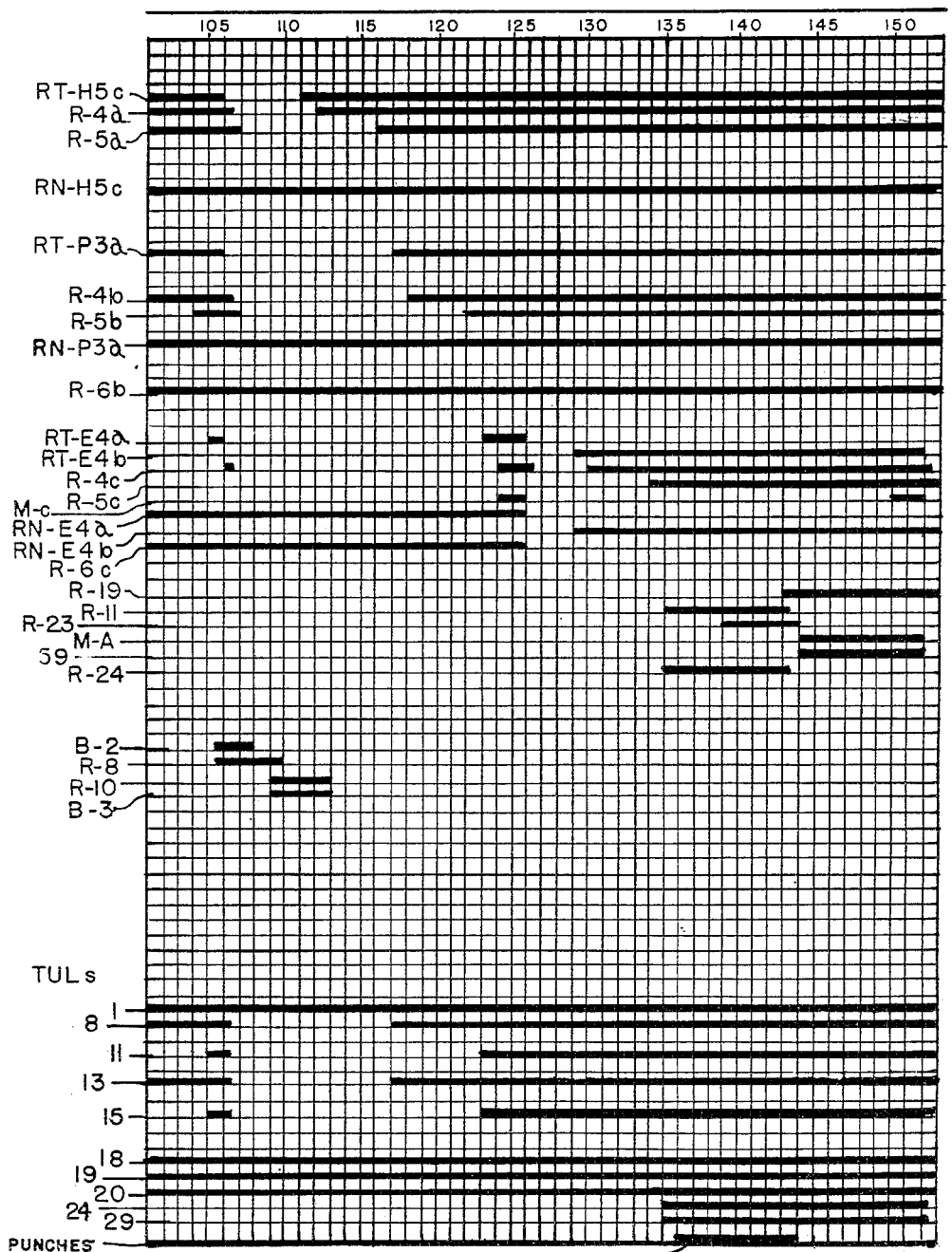
Figure 13E:
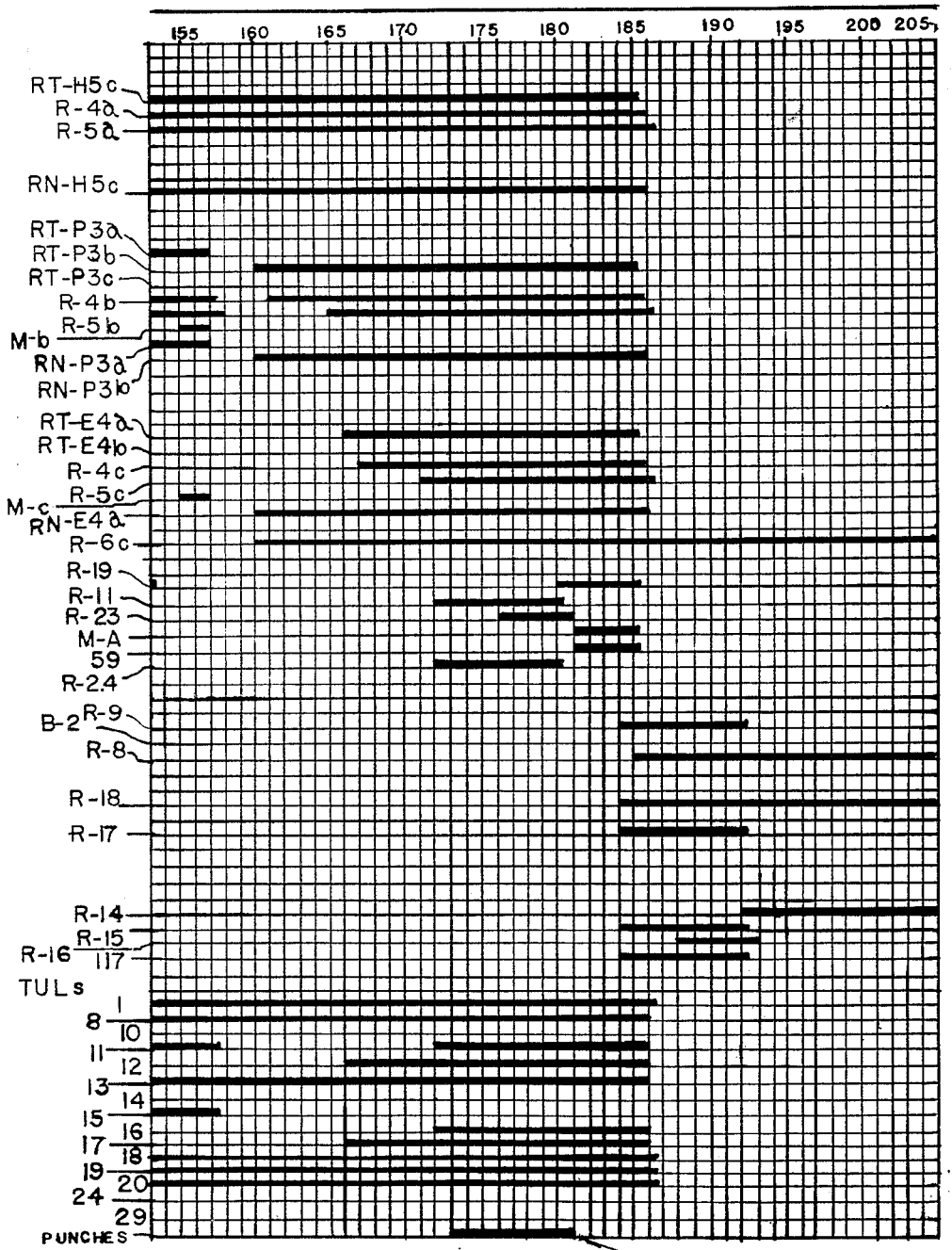
Figure 13F:
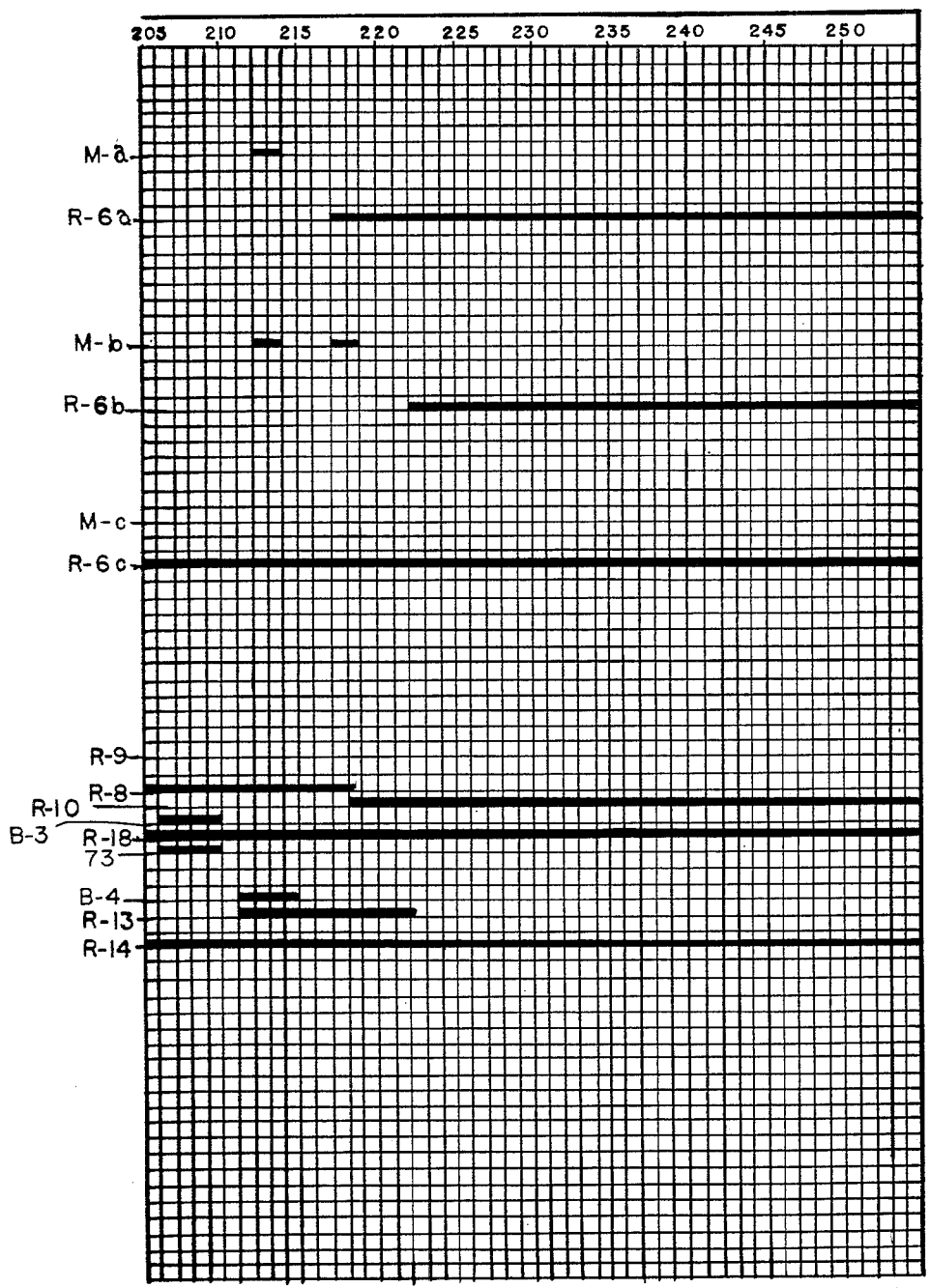
Figure 13G:
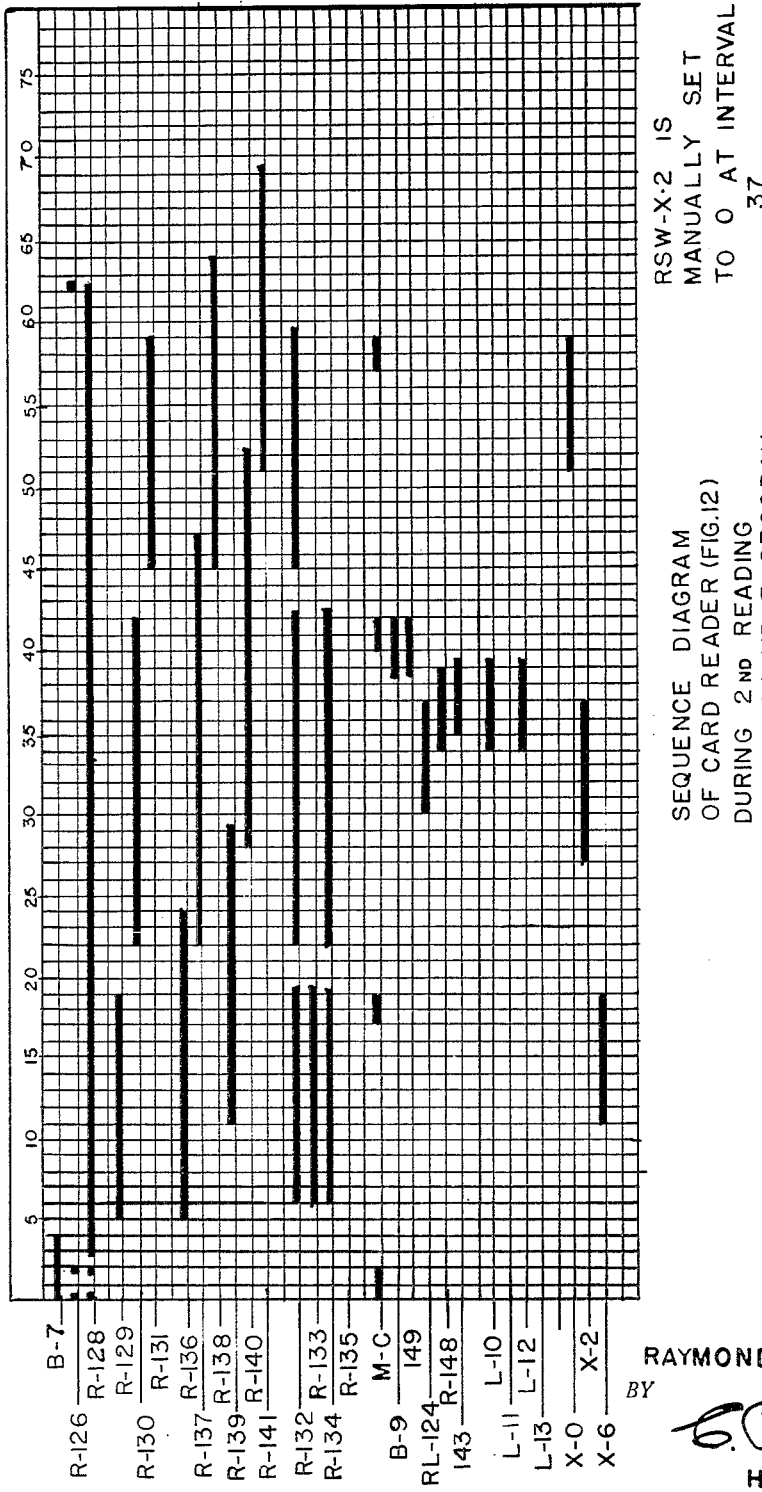

It will be noted that in Fig. 4 are shown the connections of the group representing the subject History 5 and in Fig. 1b are shown the group representing the subject RSW—A (Fig. 2) is set at 4 on its dial 91 before the start button B-1 (Fig. 1a) is depressed. During the operation of the machine B-2 (Fig. 1a) the stop button will be pressed then the continue button B-3 (Fig. 1a) will be pressed. Upon the stopping of the machine on the production of the fourth program the continue button (B-2) will be depressed. Upon the ringing of the chime 73 the machine cannot continue and the reset button B-4 (Fig. 1a) will be depressed and the machine will now be completely reset, ready to handle another problem. With reference to Fig. 13b, the R-6a is energized, B-1 is pressed, R-7 is energized, M—a is energized, RSW—a steps, R-6a is de-energized, RT—H5A and RN—H5A are energized. When RT—H5A picks up a potential appears on the arm of W-1 of RSW—a, as one of the RT input lines of RT—H5a is connected to TUL-1 therefore RSW—a steps. RT—H—5a and RN—H5a are deenergized, RT—H5b and RN—H5c are energized connecting TUL-10 and TUL-15 to 29a, connecting P-35A to D. C., connecting P-47A, P-48A and P-49A to 43. R-4a and then R-5a are energized placing a potential on TUL-10, TUL-15 and 41a. RT—P3a is energized connecting TUL-11 and TUL-15 to 29b as TUL-15 has a potential on it from RT—H5b RSW—b steps de-energizing RT—P3a, RW—P3a, R-4b, and R-6b. RT—P3b and RN—P3b are energized connecting TUL-12 and TUL-17 to 29b, placing a potential on P-36A, and connecting 43 to P-51A and to P-53A. As there is no potential on TUL-12 or TUL-17 R-4b picks up energizing R-5b applying a potential to TUL-12, TUL-17 and to 41b. RT—E4a is energized connecting TUL-11 and TUL-16 to 29c. As there is no potential on either, R-4c picks up energizing R-5c applying a potential to TUL-11, TUL-16 and 41c. During this time P-33A was connected to D. C. and P-55A was connected to wire 43. When a potential is applied it appears on 51 of Fig. 2. Upon the application of a potential to wire 51 it can be seen that there is a potential on time unit lines 10, 15, 12, 17, 11, 16, 1, 18, 19, and 20. The latter four have their punch magnets disconnected from their respective time unit lines by their associated locking relays of Fig. 3, the free time selection circuit. Upon the application of a potential to 51 R-24 is energized, P-35B, P-36B and P-33B are grounded and P-47A, P-48A, P-49A, P-51A, P-53A, P-55A have a potential placed on them when 43 is connected to D. C. by relay R-24. The circuit of Fig. 2 causes punches P-10, 15, 12, 17, 11, 16, 35, 36, 33, 47, 48, 49, 51, 53, and 55 to punch holes in the respective spaces in the unpunched program card (Fig. 6). Upon the de-energization of the punch magnets M—A (Fig. 2) is energized causing RSW—A to step once, a potential is applied to the card eject mechanism, the punched card is ejected, another unpunched card is moved in position and a potential is applied to 56 of Fig. 2 for a short interval. When a potential appears on 56 it appears on 23c, it energizes M—c; upon the de-energization of M—c RSW—c steps causing RT—E4b and RN—E4b to be energized, this connects TUL-24 and TUL-29 to 29c. As there is no potential on 29c bank c settles down applying a voltage to wire 51 of Fig. 2. Upon the application of a potential to 51 punches P-10, 15, 12, 17, 24, 29, 35, 36, 37, 47, 48, 49, 51, 53, 55, and 56 are caused to punch holes in their respective spaces in the program card. The card is rejected, M—A is energized stepping from position 3 to position 2 (indicating that two more programs will be produced before the machine stops), and a potential is applied for a short duration to 56 causing RSW—c to stop. As there is no section English-4c wire 38c is connected to D. C. Upon the stepping of RSW—c to its position C-3 a potential appears on 29 as soon as the contact arm W-2 of RSW—c touches C-3 this causes M—c to step, but as W-4 of RSW—c connects M—b in parallel with M—c both RSW—b and RSW—c will step. Bank c can not begin to select until bank b has settled down. RT—P3c and RN—P3c are energized connecting TUL-14, TUL-29, and CL—X3 to 29b. Section P-3c is closed, therefore there is a potential on 29b causing RSW—b to step. As the contact arm W-4 of bank b is on its C-3 placing M—a in parallel with M—b, both RSW—a and RSW—b step. Bank a settles down placing a potential on TUL-8, TUL-13, P-39A, P-47A, P-48A, P-49A, P-50A. Upon the settling down of bank a RT—P3a is energized connecting TUL-11 and TUL-15 to 29b as there is no potential on this time unit line bank b settles down placing a potential on TUL-11, TUL-15, P-32A, P-47A, and P-50A. Upon the settling down of bank b the stop button B-2 (Fig. 1a) is pressed. When B-2 is pressed R-8 is energized causing L-3 to light. R-8 becomes self-energizing through its upper contact simultaneously wire 42 is disconnected from 68. RT—H5c and RT—P3a are de-energized causing R-4a and R-4b to be de-energized. When R-4a and R-4b are de-energized their respective R-5a and R-5b are de-energized. The potential placed on time unit lines 8, 13, 11 and 15 was removed. The machine is now stopped. Upon the pressing of B-3 (Fig. 1a) the continue button R-10 is energized causing R-8 to become de-energized, L-3 goes out, a potential appears on wire 42, RT—H5c is energized, potential is placed on TUL-8 and TUL-13, R4a is energized, R-5a is energized, RT—P3a is energized, a potential is placed on TUL-11 and on TUL-15, R-4b is energized, and R-5b is energized. Now the operation of the machine continues from where it left off at the pressing of the stop button. RT—E4a is energized connecting TUL-11 and TUL-16 to 29c but TUL-11 has a potential on it from RT—P3a therefore RSW—c steps. RT—E4b is energized connecting TUL-24 and TUL-29 to 29c, connecting D. C. to P-37A, RN—E4b was energized connecting 43 to P-56. Bank c settles down on C-2 placing a potential on wire 51. Punch magnets P-8, 13, 11, 15, 24, 29, 39, 32, 37, 47, 48, 49, 50, 51, 54, P-55, P-56 will be energized, M—A will be energized causing RSW—A to step from position 2 to position 1, the card just punched will be rejected, a new card will be positioned, RSW—c will be stepped to its third position. As there is no English 4c section bank c will step to the next contact C-1. When at position C-3, W-4 of RSW—c placed Mb in parallel with M—c therefore both bank c and bank b stepped simultaneously. RT—P3b and RN—P36 are energized, R-4b and then R-5b are energized, potential is applied to TUL-12, TUL-17 and to 41b, RT—E4a and RN—E4a are energized, bank c settles down applying a potential to wire 51 of Fig. 2 causing punch magnets 8, 13, 12, 17, 11, 16, 39, 36, 33, 47, 48, 49, 50, 51, 53, and 55 to be energized thus punching holes in their respective spaces in a blank program card. When R-19 (Fig. 2) is energized the eject mechanism and M—A have voltage applied to them M—A causes RSW—A to step from position one to position zero, as SW-3 is closed a voltage appears on 61 causing the machine to step automatically. When the potential appears on 61 of Fig. 1a R-11 is energized R-15, R-19 (Fig. 1a), R-17 (Fig. 3), 117 and R-21 (Fig. 5) are energized. The assignment circuit resets as shown in the right portion (right of interval 36) the sequence diagram 13a. Upon the closing of R-17 84 and 85 of Fig. 3 are energized releasing all the time unit line locking relays. Upon energizing of R-9 the machine is stopped as described above when the stop button B-2 was pressed. The continue button B-3 is depressed but as R-11 is energized by the potential on 61 the chime 73 rings indicating that the machine has stopped as directed. As RSW—b is on C-2 and RSW—a is on C-3 then R-6b and R-6a are de-energized. The button B-4 is then depressed applying a potential to 49 and to 50 energizing R-13. The lower contact arm of R-13 self-energizes R-13 as long as there is a direct path between 49 and 50. Upon the energization of R-13 potential is applied to L-4 indicating that the machine is being reset and a potential is applied to 47 which will reset all the banks. Upon the going out of L-4 and the lighting of L-2 the operator knows that the machine is ready to receive data, an instruction for the solving of another program and will then be ready to solve it. Upon the examination of the above four program cards produced it will be noted that a consistent program was punched in each card. It will be remembered that the subject buttons were pressed in the order History 5, Physics 3 and then English 4, therefore subject 1 is History 5, subject 2 is Physics 3 and subject 3 is English 4. In the first program card were punched the holes indicating that the sections contained in that program would meet during the following time units.

Monday 10 to 11 and 11 to 12
Tuesday 10 to 11 and 11 to 12
Friday 9:30 to 10 and 10 to 11

The holes 1B, 2B and 3A were punched indicating that the student should register for History 5, section *b*, Physics 3 section *b* and for English 4 section *a*. In the right portion of the program card were punched the holes (remembering that 1 represents a hole punched and 0 represents no hole punched) in rows. The top row read 1110 (the code number representing section number 6 or in other words History 5 section *b*). The second row punched in the right portion of the program card read 1010 (the code number representing section number 2 or in other words Physics 3 section *b*) and the third row read 1000 (the code number representing section number 1 or in other words English 4 section *a*). From examination of the punch magnets energized in the production of the other three program cards the information punched on each card can easily be found.

It will be assumed that the program card selected is that containing the most desirable program is the one just described. The card is placed into the slot of the card reading unit (Fig. 12) so that the sensing contacts C–47 through C–58 cover the portions of the card that would have been punched by the punches with the same respective numerical notation. Upon the insertion of the above-mentioned card into the slot potential will appear on only the contacts C–47, 48, 49, 51, 53, and 55. When B–7 is pressed the card reading circuit will read the top row of holes (see Fig. 13) the holes read are 110 therefore relays R–132, R–133 and R–134 are energized making a path between 147 and X–6. RSW—X6 is stepped from position 8 to position 7 (see table I) the second row of holes is read and RSW—X2 is stepped from position 1 to position 0 closing that section by placing a potential on the RT input line of RT—P3*b*. The third row of holes is read causing RSW—X0 to step from position 2 to position 1. If this card should be read again or another card read which contains in it section 2, RSW—X2 would be stepped. Upon the stepping of RSW—X2 from its zero position to its minus one position (see Fig. 4) a potential will appear on the alarm line 144 causing RL–124 to lock energizing R–148 and the alarm bell 143. Upon the ringing of the alarm the path from the contact arm of W–3 of RSW—C would be broken and the lamps in parallel with the cascade relays would be grounded allowing the ones in parallel with the energized relays to be lit. In this case relays R–132 and R–134 are energized therefore L–10 and L–12 would light. On the panel the operator would see, reading from left to right, light, no light, light, no light, meaning 1010 or in other words section 2 was the section causing the trouble. A reference to sequence diagram 13*b* will show the operation of the components involved in the card reading circuit.

Although in the preceding specification the elements of the Departmental Program Analyzer Machine described were limited to the form of electro-mechanical relays, electro-mechanical stepping switches, incandescent lamps, and the like, for ease of understanding, the invention is not to be limited to these aforementioned elements, but is to include other types of elements such as gas tubes, vacuum tubes, transistors, semiconductors, and mechanical elements which, when substituted for the elements herein described, by someone skilled in the art, will perform an analogous function to the substituted element described in the specification.

While there have been shown and described and pointed out the fundamental novel features of the invention as applied to a single modification, it will be understood that various omissions and changes in the form and details of the device illustrated in its operation may be made by those skilled in the art without departing from the spirit of the invention. It is the intention therefore to be limited only as indicated by the scope of the following claims.

I claim:

1. In a departmental program analyzer machine having a free time input circuit, the combination of a potential source, a plurality of push button switches, a plurality of punches, a plurality of locking relays, a plurality of bulbs, a plurality of relay unlocking mechanisms, a plurality of time unit lines to form a means for a time unit to be excluded from a group of programs to be produced, each of said associated push button switches being depressed for picking up and locking the associated locking relay for applying a potential to the associated time unit line, for lighting the associated bulb, and for disconnecting the associated punch from its associated time unit line, and a means for enabling all or a group of unlocking mechanisms to be energized unlocking the associated relays, and removing the potential from the associated time unit lines and causing the associated bulbs to go out, and connecting the associated punch to its associated time unit line.

2. In a departmental program analyzer machine having a card reading circuit, the combination of a potential source, a sensing device, a relay cascade, a plurality of counters, a plurality of bulbs, a plurality of closed section lines, an alarm, an alarm line; said card reading circuit sensing a program card with holes punched in it in the form of binary system code numbers so that upon being sensed certain of the cascade relays are energized producing a path from a voltage source to the counter associated with the section whose code number is being sensed, causing said counter to make one step in such a direction as to decrease the number indicated on that counter by one, said counter upon reaching its zero position causing a circuit to be closed placing a potential on the closed section line associated with that counter, simultaneously lighting a bulb indicating that the associated sections have been closed, said counter upon being stepped from its zero position to its minus one position causing a potential to be applied to the line activating an alarm, simultaneously preventing the next row of holes from being sensed, and means connecting said bulbs in parallel with their associated cascade relays, causing those bulbs in parallel with energized relays to light indicating the code number of the section whose associated counter was caused to step to its minus one position.

3. In a departmental program analyzer machine having a subject assignment circuit, the combination of a plurality of closed section lines, a plurality of contact groups, a plurality of time unit lines, a plurality of punches, a record line, a potential source to form a means for connecting time unit lines and closed section lines to the contact groups of each selector bank in such a manner as to have each group of contacts represent a section in that the contacts of a group are connected to a different time unit lines, these aforesaid time unit lines being associated with the time units during which that section, represented by the said group of contacts, meets and that one contact of said group is connected to the closed section line associated with the section which the said group of contacts represents, and means for connecting the punches associated with the said selector bank to a record line, in a manner that the punches would punch in a card the binary code number representing the section associated with the group of contacts being examined or having been selected by that bank, upon a potential appearing on said record line.

References Cited in the file of this patent

UNITED STATES PATENTS

| | | |
|---|---|---|
| 2,034,103 | Lasker | Mar. 17, 1936 |
| 2,034,791 | Bailey et al. | Mar. 24, 1936 |
| 2,146,283 | Bryce | Feb. 7, 1939 |
| 2,244,262 | Rowley | June 3, 1941 |